(12) United States Patent
Mizushiro

(10) Patent No.: US 9,456,206 B2
(45) Date of Patent: Sep. 27, 2016

(54) STEREOSCOPIC SPECTACLES CONTROL DEVICE, DISPLAY DEVICE, AND STEREOSCOPIC SPECTACLES CONTROL METHOD

(71) Applicant: SEIKO EPSON CORPORATION, Tokyo (JP)

(72) Inventor: Kenji Mizushiro, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 202 days.

(21) Appl. No.: 14/032,576

(22) Filed: Sep. 20, 2013

(65) Prior Publication Data

US 2014/0085438 A1 Mar. 27, 2014

(30) Foreign Application Priority Data

Sep. 27, 2012 (JP) ................................. 2012-213717

(51) Int. Cl.
*H04N 13/00* (2006.01)
*H04N 13/04* (2006.01)

(52) U.S. Cl.
CPC ...... *H04N 13/0497* (2013.01); *H04N 13/0438* (2013.01)

(58) Field of Classification Search
CPC ..... H04N 13/0438; H04N 13/0497; H04N 13/0422; H04N 13/0055; H04N 13/0425; G09G 5/10; G09G 3/3233; G09G 3/3258; G09G 3/342; G09G 2300/0819; G09G 2300/0842; G09G 2300/0852; G09G 2300/0861; G09G 2310/0221; G09G 2310/0251; G09G 2310/0262; G09G 2310/06; G09G 2310/061; G09G 2320/0247; G09G 2320/026

See application file for complete search history.

(56) References Cited

U.S. PATENT DOCUMENTS

| | | | |
|---|---|---|---|
| 5,574,756 A * | 11/1996 | Jeong | 375/376 |
| 5,715,358 A * | 2/1998 | Ohnaka et al. | 386/316 |
| 2004/0120441 A1* | 6/2004 | Karlquist | 375/371 |
| 2009/0051759 A1* | 2/2009 | Adkins et al. | 348/53 |
| 2011/0001808 A1* | 1/2011 | Mentz et al. | 348/59 |
| 2011/0292191 A1 | 12/2011 | Macnaughton et al. | |
| 2011/0310348 A1* | 12/2011 | MacNaughton et al. | 353/8 |
| 2012/0176485 A1* | 7/2012 | Miyauchi et al. | 348/56 |
| 2013/0038706 A1 | 2/2013 | Nagara | |
| 2013/0093471 A1* | 4/2013 | Cho et al. | 327/107 |

FOREIGN PATENT DOCUMENTS

| | | |
|---|---|---|
| JP | 2001075045 A | 3/2001 |
| JP | A-2011-239389 | 11/2011 |
| JP | 2012178783 A | 9/2012 |

* cited by examiner

*Primary Examiner* — Jay Patel
*Assistant Examiner* — Frank Huang
(74) *Attorney, Agent, or Firm* — Oliff PLC

(57) ABSTRACT

A phase error detection unit measures a phase error between an external synchronization signal and a spectacles control signal that is fed back, more specifically, a discrepancy between vertical synchronization timing and shutter opening/closing timing, that is, jitter. A timing correction unit corrects the shutter opening/closing timing, using the measured jitter. Specifically, a parameter indicating the corrected shutter opening/closing timing is written to a storage unit. The storage unit stores a parameter used to generate the spectacles control signal, for example, the parameter indicating the shutter opening/closing timing. A signal generation unit generates the spectacles control signal, using the parameter stored in the storage unit. A frequency divider divides the frequency of the spectacles control signal by n.

11 Claims, 19 Drawing Sheets

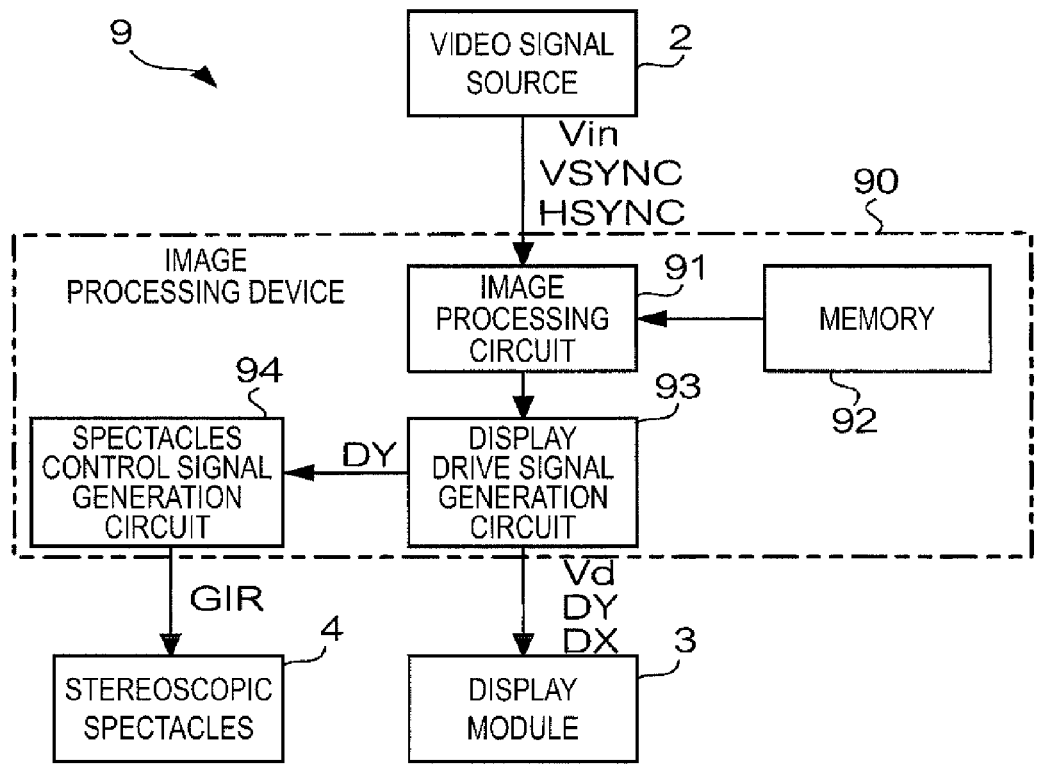
FIG. 1
FIG. 2A
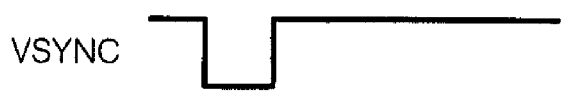
VSYNC
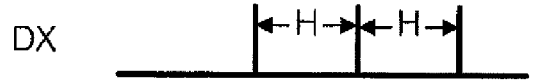
DX
DY
FIG. 2B
VSYNC
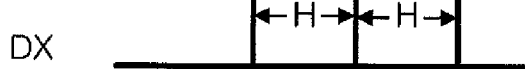
DX
DY
JITTER

STEREOSCOPIC SPECTACLES CONTROL DEVICE, DISPLAY DEVICE, AND STEREOSCOPIC SPECTACLES CONTROL METHOD

The entire disclosure of Japanese Patent Application No. 2012-213717, filed Sep. 27, 2012 is expressly incorporated by reference herein.

BACKGROUND

1. Technical Field

The present invention relates to a technique for controlling stereoscopic spectacles.

2. Related Art

A stereoscopic system using a display device which alternately displays a right-eye image and a left-eye image and spectacles which alternately open and close a right-eye shutter and a left-eye shutter according to an external control signal is known. JP-A-2011-239389 discloses a technique for synchronizing the operation of spectacles with a display device in a stereoscopic system.

According to the technique of JP-A-2011-239389, in some cases, the opening/closing timing of the shutters cannot be detected from the control signal because of the influence of jitter (phase error).

SUMMARY

An advantage of some aspects of the invention is to provide a technique for generating a control signal with reduced phase error to stereoscopic spectacles is provided.

An aspect of the invention provides a stereoscopic spectacles control device including: a signal generation unit which generates a control signal indicating an opening/closing timing of a shutter of stereoscopic spectacles, based on a parameter; a detection unit which detects phase error between an external synchronization signal and the control signal generated by the signal generation unit; and a correction unit which corrects the parameter according to the phase error detected by the detection unit.

According to this stereoscopic spectacles control device, a control signal with reduced phase error can be generated, compared with the case where correction using the external synchronization is not carried out.

In a preferred embodiment, the parameter may include a first parameter indicating a cycle of the opening/closing timing. If the phase error indicates that the opening/closing timing of the shutter is earlier than timing indicated by the external synchronization signal, the correction unit may correct the first parameter to prolong the cycle.

According to the stereoscopic spectacles control device of this configuration, if the opening/closing timing is earlier than the timing indicated by the external synchronization signal, the opening/closing timing of the shutter can be corrected.

In another preferred embodiment, if the phase error indicates that the opening/closing timing of the shutter is later than the timing indicated by the external synchronization signal, the correction unit may correct the first parameter to shorten the cycle.

According to the stereoscopic spectacles control device of this configuration, if the opening/closing timing of the shutter is later than the timing indicated by the external synchronization signal, the opening/closing timing of the shutter can be corrected.

In still another preferred embodiment, the parameter may include a second parameter indicating a discrepancy of the opening/closing timing from the external synchronization signal. The correction unit may correct the first parameter in such a way that the discrepancy of the opening/closing timing from the external synchronization signal after correction approaches the second parameter.

According to the stereoscopic spectacles control device of this configuration, the discrepancy between the opening/closing timing of the shutter and the timing indicated by the external synchronization signal can be made closer to a preset value.

In yet another preferred embodiment, the stereoscopic spectacles control device may include a storage unit which stores the parameter. The correction unit may include a proportional control unit which calculates a first correction amount using a linear function of the phase error, an integral control unit which calculates a second correction amount using an integral of the phase error, and an addition unit which adds a sum of the first correction amount and the second correction amount to the parameter stored in the storage unit.

According to the stereoscopic spectacles control device of this configuration, the opening/closing timing of the shutter can be corrected, using the proportionally controlled and integrally controlled correction amounts.

In still yet another preferred embodiment, the correction unit may have a filter unit which filters the phase error, using a filter coefficient that changes according to the size of the phase error. The proportional control unit may calculate the first correction amount, using the phase error that is filtered. The integral control unit may calculate the second correction amount, using the phase error that is filtered.

According to the stereoscopic spectacles control device of this configuration, the opening/closing timing of the shutter can be corrected, using the filtered phase error.

In further another preferred embodiment, the filter coefficient may have such a characteristic that the filter coefficient approaches a minimum value as the phase error within a predetermined first range increases.

According to the stereoscopic spectacles control device of this configuration, the opening/closing timing of the shutter can be corrected, using the phase error that is filtered with the filter coefficient having such a characteristic that the filter coefficient approaches a minimum value as the phase error increases.

In still further another preferred embodiment, the filter coefficient may have such a characteristic that the filter coefficient approaches a maximum value as the phase error within a second range where the phase error is larger than in the first range increases.

According to the stereoscopic spectacles control device of this configuration, the opening/closing timing of the shutter can be corrected, using the phase error that is filtered with the filter coefficient having such a characteristic that the filter coefficient approaches a maximum value as the phase error increases.

In yet further another preferred embodiment, the external synchronization signal may be a vertical synchronization signal included in a video signal.

According to the stereoscopic spectacles control device of this configuration, a spectacles control signal can be synchronized with a vertical synchronization signal included in a video signal.

Another aspect of the invention provides a display device including: a signal generation unit which generates a control signal indicating an opening/closing timing of a shutter of stereoscopic spectacles, based on a parameter; a detection unit which detects phase error between an external synchronization signal and the control signal generated by the signal generation unit; a correction unit which corrects the parameter according to the phase error detected by the detection unit; and a display unit which displays a stereoscopic video based on a video signal synchronized with the external synchronization signal.

According to this display device, a control signal with reduced phase error can be generated, compared with the case where correction using the external synchronization is not carried out.

Still another aspect of the invention provides a stereoscopic spectacles control method including: generating a control signal indicating an opening/closing timing of a shutter of stereoscopic spectacles, based on a parameter; detecting phase error between an external synchronization signal and the control signal that is generated; and correcting the parameter according to the phase error that is detected.

According to this stereoscopic spectacles control method, a control signal with reduced phase error can be generated, compared with the case where correction using the external synchronization is not carried out.

BRIEF DESCRIPTION OF THE DRAWINGS

The invention will be described with reference to the accompanying drawings, wherein like numbers reference like elements.

FIG. 1 shows the configuration of a stereoscopic system 9 according to a comparative example.

FIGS. 2A and 2B illustrate jitter on a vertical synchronization signal DY.

DESCRIPTION OF EXEMPLARY EMBODIMENTS

1. Outline

Figure 3:
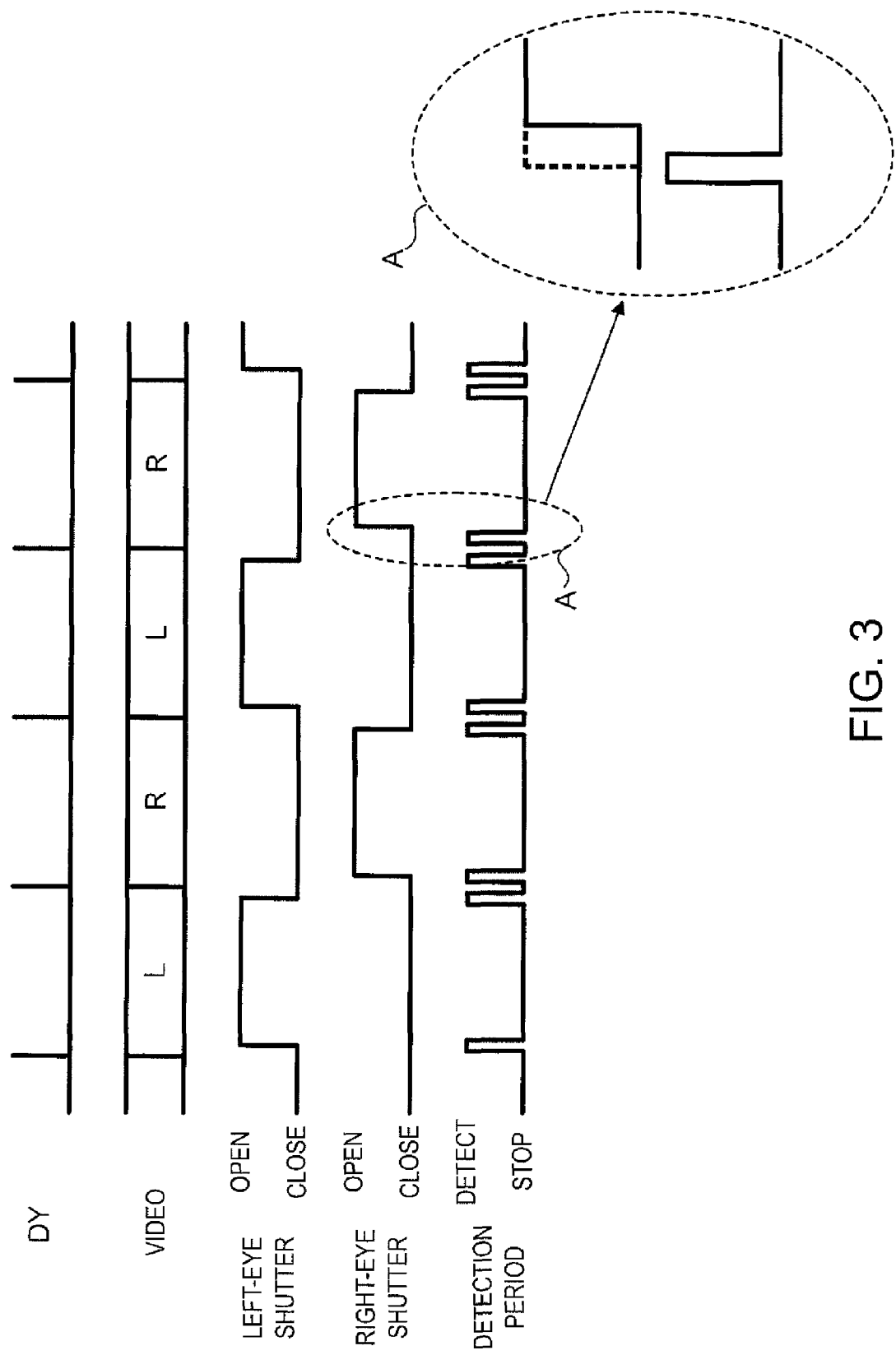
FIG. 3 illustrates an inconvenience caused by jitter.

FIG. 1 shows the configuration of a stereoscopic system 9 according to a comparative example. The stereoscopic system 9 has a video signal source 2, an image processing device 90, a display module 3, and stereoscopic spectacles 4 (so-called 3D glasses). The video signal source 2 is a device which outputs a video signal Vin, for example, a video reproduction device, and more specifically, a device (for example, a DVD (digital versatile disc) reproduction device or personal computer) which reproduces a video recorded on a recording medium (such as an optical recording medium or magnetic recording medium), or a device (for example, a set-top box for cable television services) which produces a video from video data distributed via a network. The video signal Vin is a signal representing a stereoscopic video (so-called 3D video) and representing plural images including right-eye images and left-eye images. The video signal source 2 also outputs a vertical synchronization signal VSYNC and a horizontal synchronization signal HSYNC. The vertical synchronization signal VSYNC and the horizontal synchronization signal HSYNC are signals indicating timing of vertical synchronization and horizontal synchronization, respectively. The term "video" refers to a concept encompassing both still images and dynamic images.

The image processing device 90 is a device which processes the video signal Vin inputted thereto and outputs a signal for controlling devices on the subsequent stages (display module 3 and stereoscopic spectacles 4). The image processing device 90 has an image processing circuit 91, a memory 92, a display drive signal generation circuit 93, and a spectacles control signal generation circuit 94. The image processing circuit 91 is a circuit which carries out various kinds of image processing (for example, 2D/3D conversion, frame interpolation, resolution enhancement, keystone correction, color conversion or the like). The memory 92 is a storage device which stores data and is used as a work memory in the case of the above image processing or as a buffer memory for rate conversion in the case of outputting a signal to the display module 3. The display drive signal generation circuit 93 generates a drive signal for driving the display module 3 (hereinafter referred to as a "display drive signal"). The display drive signal includes a video signal Vd, a vertical synchronization signal DY, and a horizontal synchronization signal DX. The video signal Vd is a signal representing an image-processed video. The vertical synchronization signal DY and the horizontal synchronization signal DX are signals indicating timing of vertical synchronization and horizontal synchronization, respectively. The display drive signal is supplied to the display module 3. The spectacles control signal generation circuit 94 generates a control signal for controlling the stereoscopic spectacles 4 (hereinafter referred to as a "spectacles control signal GIR") based on the vertical synchronization signal DY. The spectacles control signal GIR is transmitted to the stereoscopic spectacles 4, for example, via wireless communication (more specifically, IR communication).

The display module 3 includes a device which displays a video according to the video signal Vd, the vertical synchronization signal DY, and the horizontal synchronization signal DX, for example, a liquid crystal panel and a drive circuit thereof. The stereoscopic spectacles 4 are a device for separately providing a right-eye image and a left-eye image to the user. The stereoscopic spectacles 4 have a receiving unit for example, an IR receiver) which receives a spectacles control signal, a right-eye shutter, and a left-eye shutter. The stereoscopic spectacles 4 open and close the right-eye shutter and the left-eye shutter according to the timing designated by the spectacles control signal GIR. Thus, in the stereoscopic spectacles 4, the opening and closing of the shutters is controlled synchronously with the driving of the display module 3. However, jitter may occur in the vertical synchronization signal DY. In this case, the stereoscopic spectacles 4 may not be able to detect the opening/closing timing of the shutters because of the influence of the jitter. Hereinafter, this problem will be described further in detail.

FIGS. 2A and 2B illustrate jitter generated in the vertical synchronization signal DY. In FIGS. 2A and 2B, the horizontal axis represents time and the vertical axis represents signal level. In this example, the external synchronization signal VSYNC is usually at high level. The timing when this signal rises to high level after temporarily falling to low level indicates the timing of horizontal synchronization. The horizontal synchronization signal DX and the vertical synchronization signal DY are usually at low level. The timing when these signals rise to high level indicates the timing of synchronization. In the example of FIG. 2A and the example of FIG. 2B, the timing of horizontal synchronization by the horizontal synchronization signal DX is the same, but the timing of vertical synchronization by the external synchronization signal VSYNC is different. Consequently, FIG. 2A shows an example where the vertical synchronization signal DY reaches high level relatively early, whereas FIG. 2B shows an example where the vertical synchronization signal DY reaches high level relatively late.

The vertical synchronization signal DY reaches high level at the timing when the horizontal synchronization signal DX oscillates (reaches high level) for the first time after the external synchronization signal VSYNC turns from low level to high level. In FIG. 2A and FIG. 2B, the timing when the horizontal synchronization signal DX oscillates is the same, but the timing when the external synchronization signal VSYNC rises to high level is different. In these examples, the horizontal synchronization signal DX is a signal which oscillates in independent timing from the external synchronization signal VSYNC (that is, free-running). Since the horizontal synchronization signal DX is a signal oscillating in a free-running manner, there is a discrepancy equivalent to up to one horizontal scanning period H between the timing of synchronization indicated by the external synchronization signal VSYNC and the timing of synchronization indicated by the vertical synchronization signal DY. That is, the vertical synchronization signal DY has jitter (timing discrepancy) equivalent to up to one horizontal scanning period H. Since the spectacles control signal generation circuit 94 generates the spectacles control signal GIR using the vertical synchronization signal DY, the spectacles control signal GIR has jitter equivalent to up to one horizontal scanning period H.

The stereoscopic spectacles 4 operate according to the spectacles control signal GIR. However, in view of power consumption, the stereoscopic spectacles 4 intermittently receive the signal instead of constantly receiving the signal. That is, the stereoscopic spectacles 4 supplies power to a circuit which receives the spectacles control signal GIR (or a circuit which detects the opening/closing timing of the shutters from the spectacles control signal GIR) only during a predetermined detection period, and does not supply power during other periods. Since the stereoscopic spectacles 4 are driven by a battery in order to enhance portability, power consumption needs to be reduced in order to prolong the time during which the stereoscopic spectacles 4 can be used. A detection period is provided for the above reason. However, there may be an inconvenience in the relation between this detection period and the above jitter.

FIG. 3 illustrates an inconvenience caused by jitter. In FIG. 3, the horizontal axis represents time and the vertical axis represents signal level (with respect to the video signal, whether the video shows a right-eye image R or a left-eye image L is shown). With respect to the detection period, a high-level period indicates that detection of timing is carried out, whereas a low-level period indicates that detection of timing is not carried out. The detection period is set by the stereoscopic spectacles 4. At this point, if the detection period (its width) is shorter than jitter, the opening/closing timing of the shutter cannot be detected in some cases. An area A of FIG. 3 shows an example where the opening/closing timing indicated by a control signal falls out of the detection period because of the influence of jitter. In an enlarged view of the signals, a broken line shows an ideal state (without jitter) and a solid line shows a state with jitter. If the opening/closing timing indicated the control signal falls out of the detection period, the opening/closing timing cannot be detected. This embodiment is to address this problem.

2. Configuration

Figure 4:
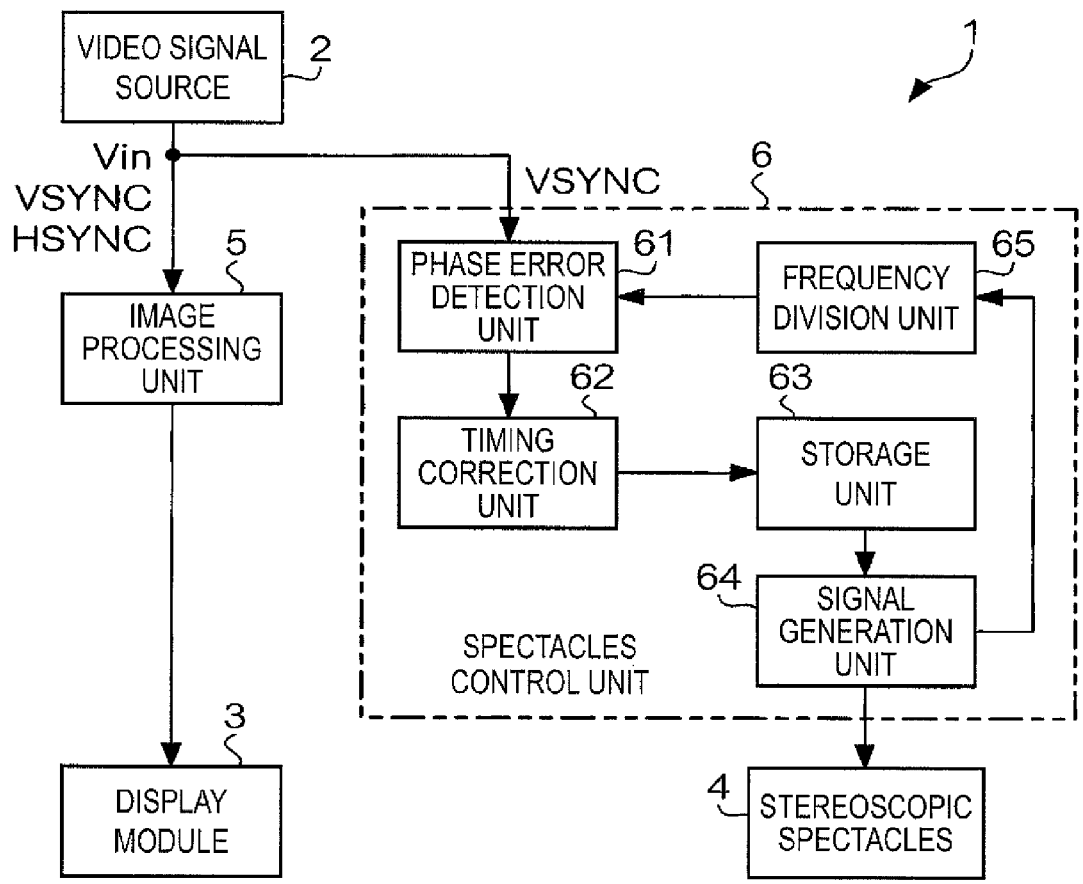
FIG. 4 shows the functional configuration of a stereoscopic system 1 according to an embodiment.

FIG. 4 shows the functional configuration of a stereoscopic system 1 according to an embodiment. The stereoscopic system 1 has a video signal source 2, display module 3, stereoscopic spectacles 4, an image processing unit 5, and a spectacles control unit 6. In the following description, the same components as in the stereoscopic system 9 are denoted by the same reference numerals. The image processing unit 5 carries out video processing to a video signal outputted from the video signal source 2, and outputs a signal for controlling the display module 3.

The spectacles control unit 6 generates a spectacles control signal using the external synchronization signal VSYNC. The spectacles control signal is feedback-controlled. That is, the spectacles control unit 6 compares the fed-back spectacles control signal with the external synchronization signal VSYNC and generates a spectacles control signal according to the result of the comparison. More specifically, the spectacles control unit 6 has a phase error detection unit 61, a timing correction unit 62, a signal generation unit 64, a storage unit 63, and a frequency division unit 65. The phase error detection unit 61 measures a phase error between the external synchronization signal VSYNC and the fed-back spectacles control signal, and more specifically, a discrepancy between the timing of vertical synchronization and the opening/closing timing of the shutter, that is, jitter. The timing correction unit 62 corrects the opening/closing timing of the shutter, using the measured jitter. More specifically, the timing correction unit 62 writes a parameter indicating the corrected opening/closing timing of the shutter into the storage unit 63. The storage unit 63 stores a parameter used to generate a spectacles control signal, for example, a parameter indicating the opening/closing timing of the shutter. The signal generation unit 64 generates a spectacles control signal using the parameter stored in the storage unit 63. The frequency division unit 65 divides the frequency of the spectacles control signal by n. For example, if the left and right shutters are opened and closed twice each during one cycle of the external synchronization signal VSYNC, jitter is measured every other opening/closing of the shutters and therefore the frequency of the spectacles control signal is divided by 2.

Figure 5:
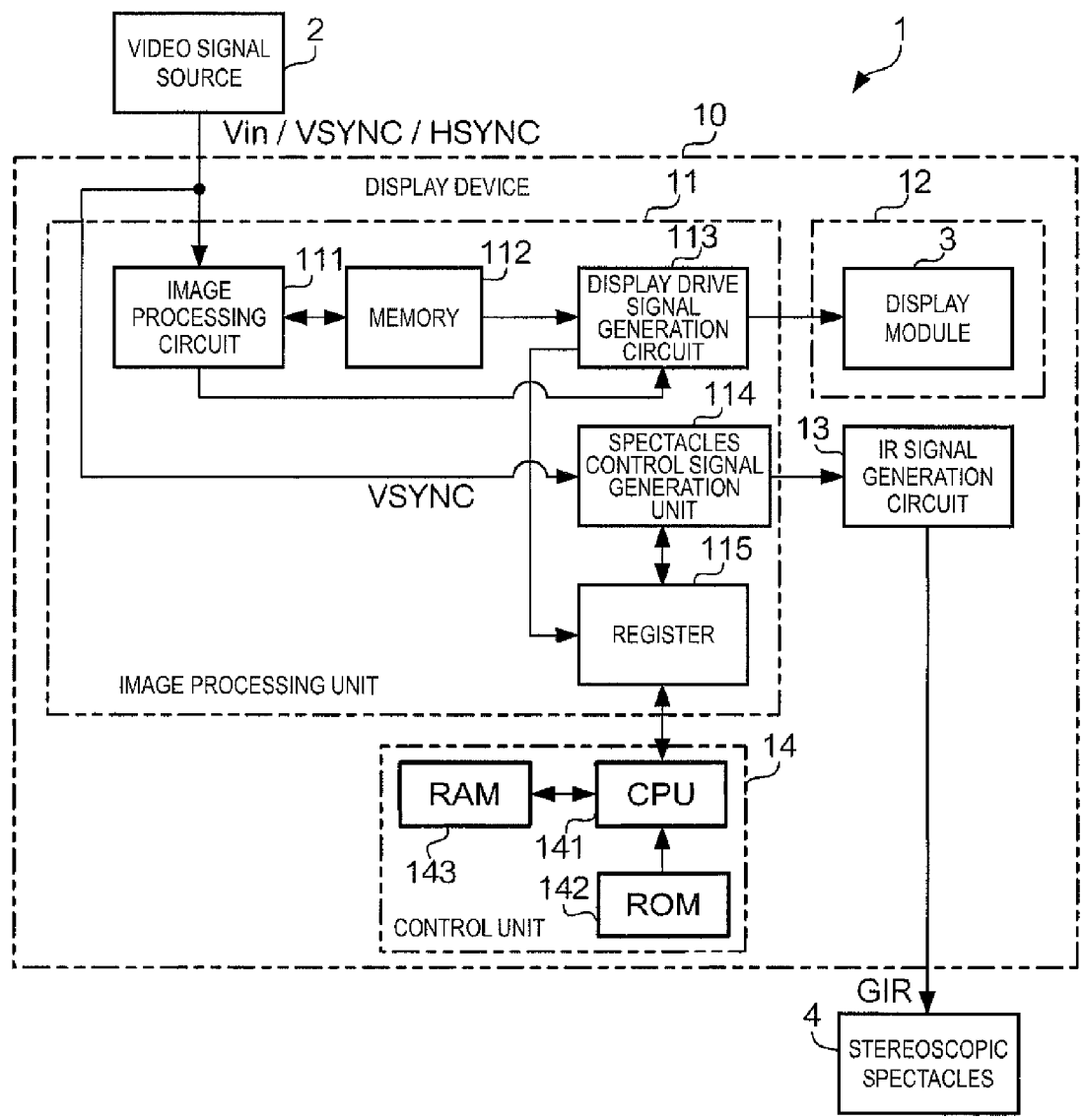
FIG. 5 shows an example of the hardware configuration of the stereoscopic system 1.

FIG. 5 shows an example of the hardware configuration of the stereoscopic system 1. In this example, the stereoscopic system 1 has a display device 10. The display device 10 is a device having the function of both the image processing unit 5 (image processing device) and the spectacles control unit 6 (spectacles control device). In this example, the display device 10 is a projector. The display device 10 has an image processing unit 11, a projection unit 12, an IR signal generation circuit 13, and a control unit 14.

The image processing unit 11 processes a video signal inputted thereto and outputs a signal for controlling devices on the subsequent stages (projection unit 12 and IR signal generation circuit 13). The image processing unit 11 has an image processing circuit 111, a memory 112, a display drive signal generation circuit 113, a spectacles control signal generation unit 114, and a register 115. The image processing circuit 111 is a circuit which carries out various kinds of image processing (for example, 2D/3D conversion, frame interpolation, resolution enhancement, keystone correction, color conversion or the like). The memory 112 is a storage device which stores data and is used as a work memory in the case of the above image processing or as a buffer memory for rate conversion in the case of outputting a signal to the display module 3. The display drive signal generation circuit 113 generates a display drive signal for driving the display module 3. The spectacles control signal generation unit 114 generates a spectacles control signal using the external synchronization signal VSYNC, and outputs the generated spectacles control signal. The spectacles control signal generation unit 114 will be described in detail later. The register 115 is a device which stores a parameter involved in the generation of the spectacles control signal. The register 115 also stores an interrupt status register. The interrupt status register is a register indicating the status of interrupt to a CPU 141. For example, if the value of the interrupt status register is "0", it indicates that no interrupt is taking place. If the value is "1", it indicates that there is an interrupt taking place.

The projection unit 12 projects a video according to a signal outputted from the image processing unit 11. For example, the projection unit 12 has the display module 3 (liquid crystal panel and liquid crystal drive circuit), a light source, a lens, a color-combining prism, and a dichroic mirror (other components than the display module 3 are not shown). The IR signal generation circuit 13 generates a control signal. GIR that is an IR signal according to a control signal outputted from the spectacles control signal generation unit 114, and outputs the generated control signal GIR. The control unit 14 controls the image processing unit 11. The control unit 14 has a CPU (central processing unit) 141, a ROM (read only memory) 142, and a RAM (random access memory) 143. The ROM 142 is a storage device which stores a program for generating the spectacles control signal. The RAM 143 is a storage device which functions as a work area when the CPU 141 executes the program. The CPU 141 reads out the program stored in the ROM 142 and executes the program that is read out. In this example, the functions of the phase error detection unit 61 and the timing correction unit 62 (FIG. 4) are implemented by firmware stored in the ROM 142.

Figure 6:
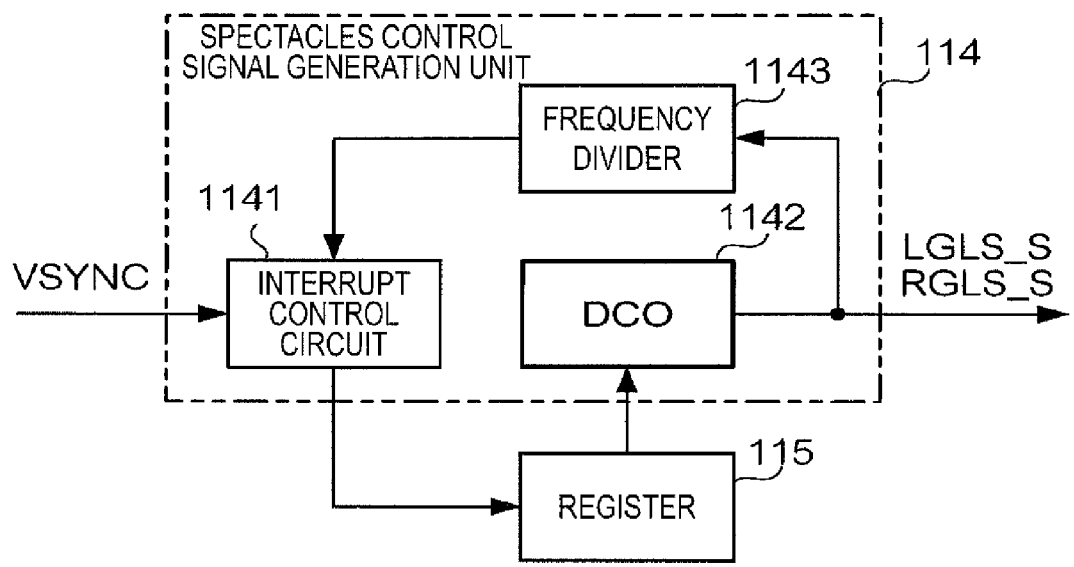
FIG. 6 shows the hardware configuration of a spectacles control signal generation unit 114.

FIG. 6 shows the hardware configuration of the spectacles control signal generation unit 114. The spectacles control signal generation unit 114 has an interrupt control circuit 1141, a DCO (digitally controlled oscillator) 1142, and a frequency divider 1143. The interrupt control circuit 1141 is a circuit which controls an interrupt to the CPU 141. In this example, if a predetermined interrupt condition is satisfied, the interrupt control circuit 1141 rewrites the value of the interrupt status register in the register 115 to "1" and thus generates an interrupt to the CPU 141. As an interrupt from the interrupt control circuit 1141 is received, the CPU 141 executes the firmware and carries out processing as the phase error detection unit 61 and the timing correction unit 62. The DCO 1142 is an oscillator which outputs a signal oscillating in timing according to the parameter stored in the register 115. The signal outputted from the DCO 1142 is the spectacles control signal for controlling the opening/closing of the shutters in the stereoscopic spectacles 4.

Figure 7:
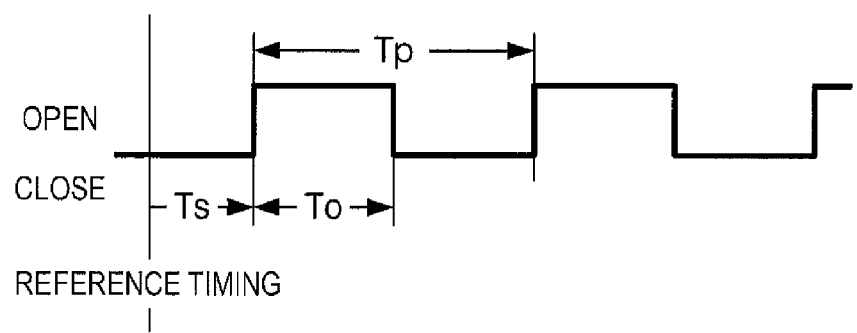
FIG. 7 illustrates a parameter used for controlling a DCO 1142.

FIG. 7 illustrates a parameter used to control the DCO 1142. FIG. 7 shows the spectacles control signal. For example, a parameter indicating a cycle Tp of shutter opening/closing, a parameter indicating a time period To during which the shutter is open, and a parameter indicating a time period Ts from reference timing to timing of opening the shutter are stored in the register 115. The period from one reference timing to the next reference timing is called a "reference cycle". In this example, the reference timing is timing that is defined by the external synchronization signal VSYNC and indicates the start (or the end) of the reference cycle. As the time period Ts passes from predetermined reference timing, the CPU 141 causes the DCO 1142 to output a control signal. The DCO 1142 outputs a high-level signal during the time period To and then outputs a low-level signal. Moreover, as the time period Tp passes after the output of a high-level signal is started, the DCO 1142 outputs a high-level signal again. Afterwards, the DCO 1142 continues to output a high-level signal during the time period To on the cycle Tp. These parameters are separately set for the left eye and the right eye. When a left-eye parameter and a right-eye parameter are discriminated from each other, subscripts L and R are used to describe, for example, TpL and TpR.

The spectacles control signal outputted from the DCO 1142 includes a signal synchronized with the external synchronization signal VSYNC and a signal that is not synchronized with the external synchronization signal VSYNC. The former is called an "externally synchronized spectacles control signal". The latter is called an "internally synchronized spectacles control signal". Externally synchronized spectacles control signals for controlling the left-eye shutter and the right-eye shutter are referred to as control signals LGLS_S and RGLS_S, respectively. Internally synchronized spectacles control signals for controlling the left-eye shutter and the right-eye shutter are referred to as control signals LGLS and RGLS, respectively.

Referring again to FIG. 6, the frequency divider 1143 outputs a signal obtained by dividing the frequency of the spectacles control signal (control signals LGLS_S and RGLS_S) by n to the interrupt control circuit 1141. The interrupt control circuit 1141 determines whether to generate an interrupt or not, using at least one of the external synchronization signal and the n-frequency-divided spectacles control signal. In order to obtain the reference timing from the external synchronization signal VSYNC, a frequency divider may be provided for the external synchronization signal VSYNC.

Figure 8:
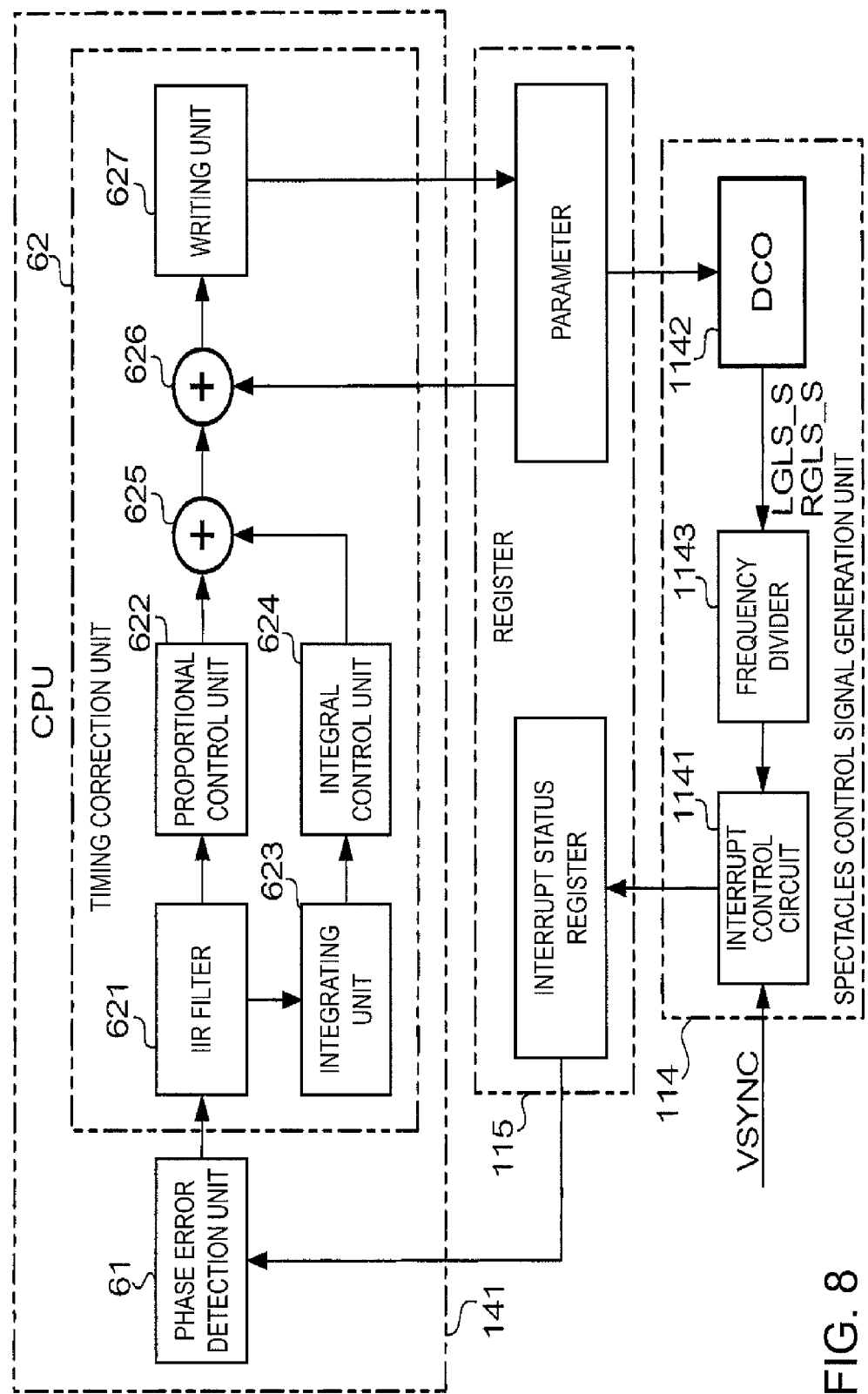
FIG. 8 shows an example of implementation of a spectacles control unit 6.

FIG. 8 shows an example of implementation of the spectacles control unit 6. As already described above, the functions of the phase error detection unit 61 and the timing correction unit 62 are implemented by the CPU 141 executing the firmware. The timing correction unit 62 is a loop filter having an IIR (infinite impulse response) filter 621, a proportional control unit 622, an integrating unit 623, an integral control unit 624, an adding unit 625, an adding unit 626, and a writing unit 627.

If the phase error between the external synchronization signal VSYNC and the n-frequency-divided spectacles control signal satisfies a predetermined condition, the phase error detection unit 61 calls the function of the timing correction unit 62. The timing correction unit 62 performs feedback control of the spectacles control signal by so-called PID control. The IIR filter 621 performs predetermined filtering of the detected phase error. The proportional control unit 622 performs proportional control of the filtered phase error, using a proportional gain Kp. The integrating unit 623 integrates the filtered phase error. The integral control unit 624 performs integral control of the integrated phase error, using an integral gain Ki. The adding unit 625 adds the result of the calculation by the proportional control unit 622 and the result of the calculation by the integral control unit 624. The result of the calculation by the adding unit 625 shows a correction amount of the parameter used to generate the spectacles control signal. The adding unit 626 reads out the value of the parameter stored in the register 115 (that is, the parameter that is currently used to generate the spectacles control signal) and adds the result of the calculation by the adding unit 625 (correction amount) to the read-out value. The result of the calculation by the adding unit 626 shows the value of the parameter after correction. The writing unit 627 writes the result of the calculation by the adding unit 626 to the register 115.

When the value of the parameter is rewritten in the register 115, the DCO 1142 generates and outputs control signals LGLS_S and RGLS_S according to the rewritten parameter. Feedback control is carried out further, using the generated control signals LGLS_S and RGLS_S.

The image processing circuit 111 is an example of the image processing unit 5. The CPU 141 executing the firmware is an example of the phase error detection unit 61 and the timing correction unit 62. The register 115 is an example of the storage unit 63. The DCO 1142 is an example of the signal generation unit 64. The frequency divider 1143 is an example of the frequency division unit 65.

3. Operation

Figure 9:
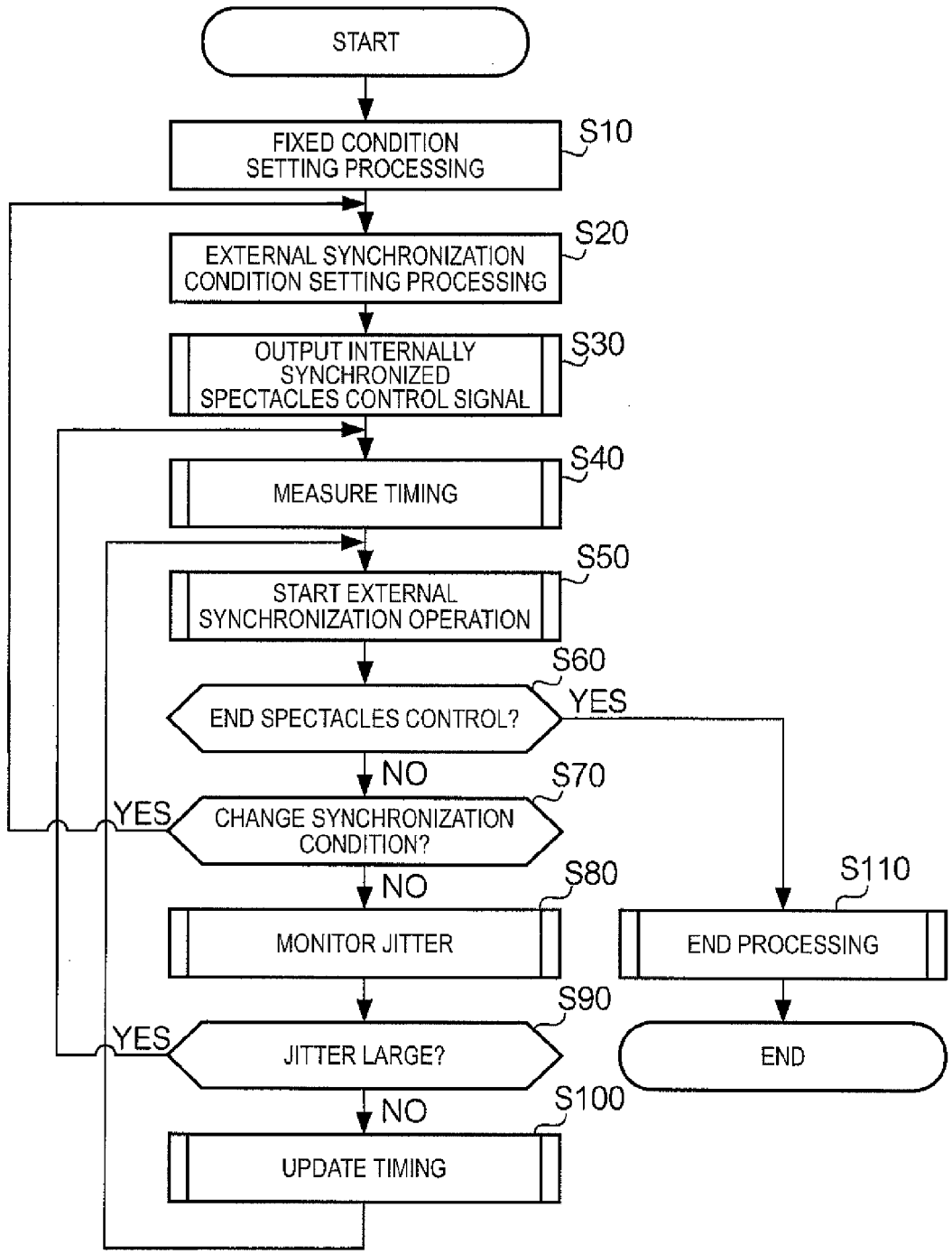
FIG. 9 is a flowchart showing an operation of a display device 10.

FIG. 9 is a flowchart showing an operation of the display device 10. The flow of FIG. 9 starts, for example, triggered by the fact that power is turned on in the display device 10.

In step S10, the CPU 141 carries out fixed condition setting processing. The fixed condition setting processing is processing to set a fixed condition. A fixed condition is a condition that does not depend on the type of the video signal source 2 or the driving of the display module 3. The expression that the CPU 141 "sets" something means that the CPU 141 writes the value of a parameter used for associated processing into a storage unit such as a register (register 115 or another register). The fixed condition setting processing includes, for example, processing to start up various circuits and write the value of a fixed parameter. A fixed parameter is a parameter that does not depend on the type of the video signal source 2 or the driving of the display module 3, such as positive/negative logic selection of the external synchronization signal VSYNC or selection of a synchronization mode (later described).

In step S20, the CPU 141 carries out external synchronization condition setting processing. The external synchronization condition setting processing is processing to write the value of a parameter that depends on the type of the video signal source 2 or the driving of the display module 3, into a register. The external synchronization condition setting processing includes, for example, processing to rewrite the value of a frequency division number n in the frequency divider 1143. The value of the frequency division number n is re-set, for example, when the video signal source 2 is switched. The value of the frequency division number n is decided by the relation between the frequency of the external synchronization signal and the drive frequency of the display module 3 (liquid crystal panel) (more specifically, the frequency of opening/closing the shutter in the stereoscopic spectacles 4). The ratio of the frequency of the external synchronization signal to the drive frequency of the display module 3 is called a multiplication number. There are various variations of multiplication number.

Figure 10:
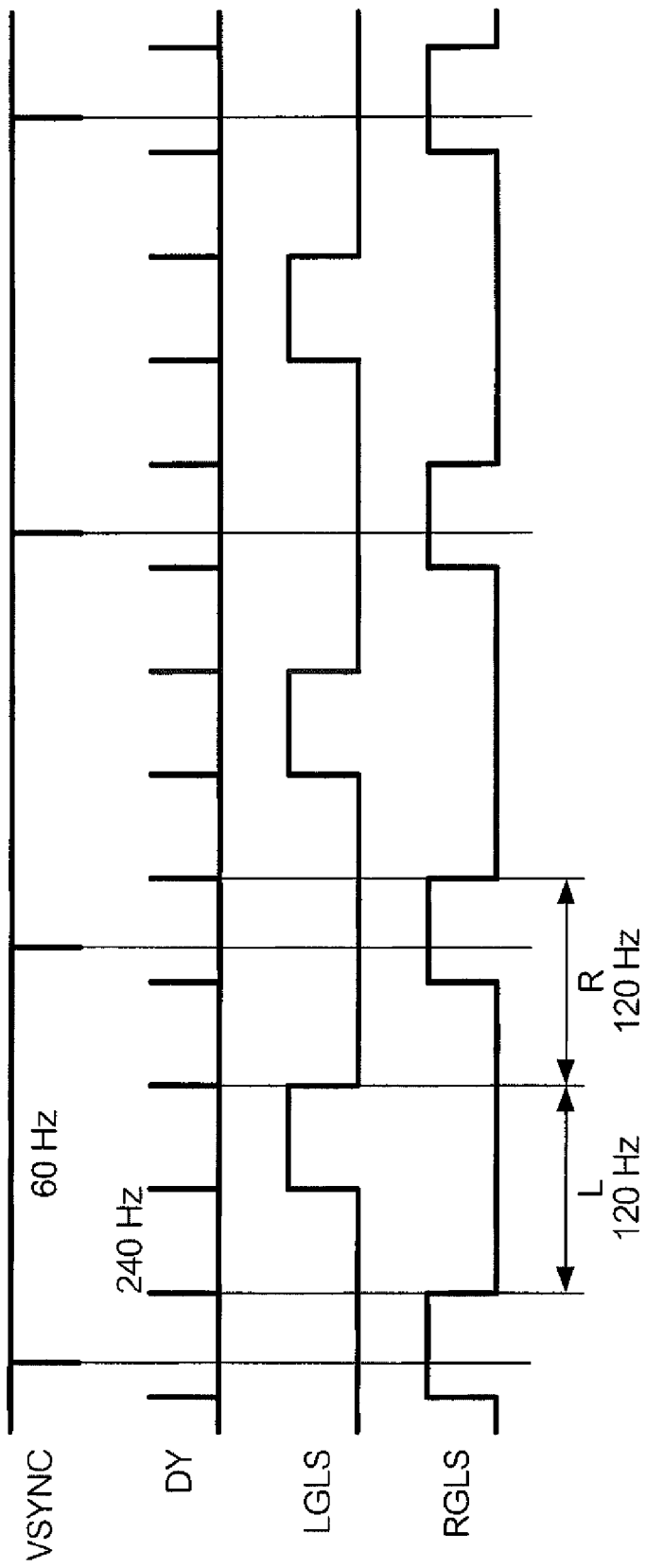
FIG. 10 shows an example of quadruple multiplication.

FIG. 10 shows an example of quadruple multiplication. In this example, the frequency of the video signal Vin is 60 Hz (120 Hz each on the left and right) and the frequency of the external synchronization signal VSYNC is 60 Hz. The drive frequency of the display module 3 is 240 Hz. The left and right shutters opened and closed once each while the external synchronization signal occurs once (every cycle). That is, in this example, a period equivalent to one cycle of the external synchronization signal is a reference cycle. The timing when the external synchronization signal VSYNC reaches high level is reference timing (indicated by a broken line in FIG. 10). In this example, since the opening and closing of the shutters is carried out once in the reference cycle, the frequency division number n of the frequency divider 1143 is 1.

Figure 11:
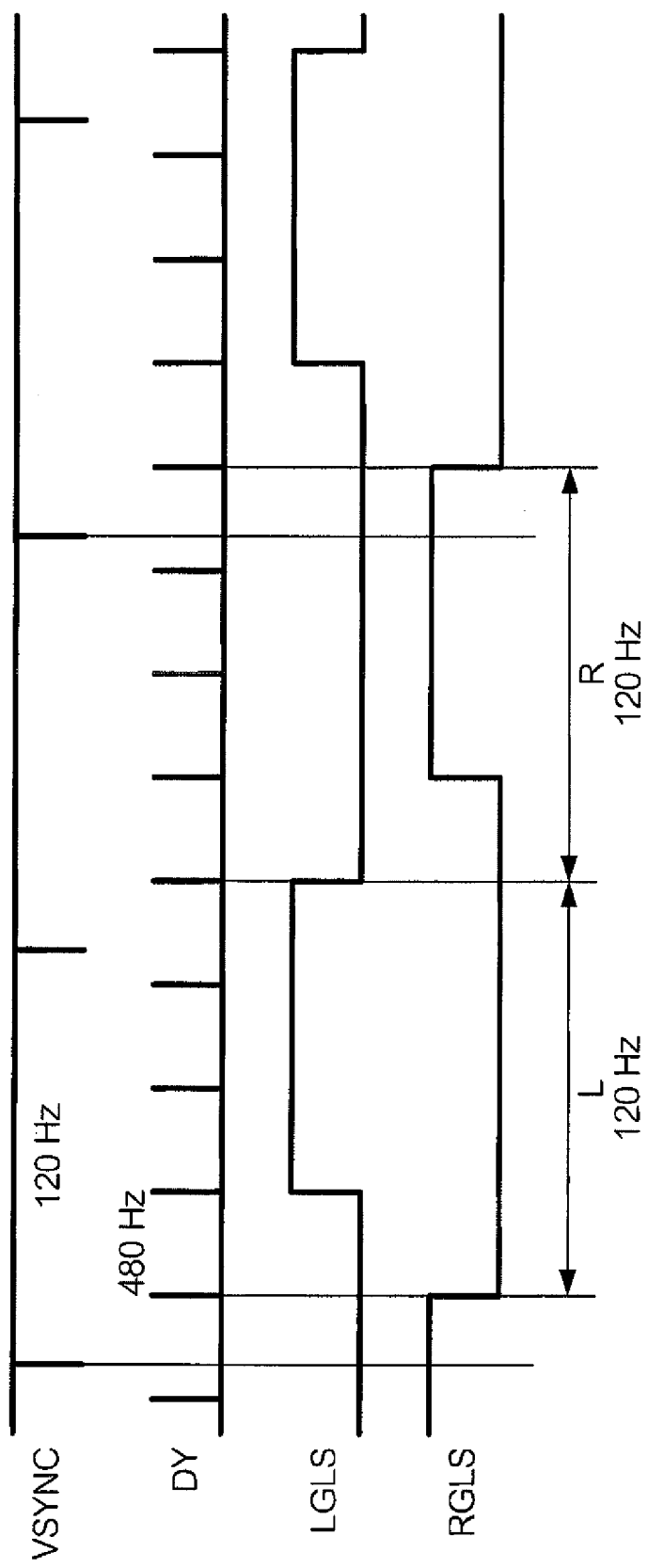
FIG. 11 shows another example of quadruple multiplication.

FIG. 11 shows another example of quadruple multiplication. In this example, the frequency of the video signal Vin is 60 Hz (120 Hz each on the left and right) and the frequency of the external synchronization signal VSYNC is 120 Hz. The drive frequency of the display module 3 is 480 Hz. The left and right shutters opened and closed once each while the external synchronization signal occurs twice (every two cycles). That is, in this example, a period equivalent to two cycles of the external synchronization signal is a reference cycle. The timing when the external synchronization signal VSYNC reaches high level every other time is reference timing (indicated by a broken line in FIG. 11). In this example, since the opening and closing of the shutters is carried out once in the reference cycle, the frequency division number n of the frequency divider 1143 is 1. Also, in order to obtain the reference timing, the external synchronization signal VSYNC may be divided by 2 by a frequency divider, not shown. The reference timing may also be obtained by other methods than dividing the frequency of the signal by a frequency divider.

Figure 12:
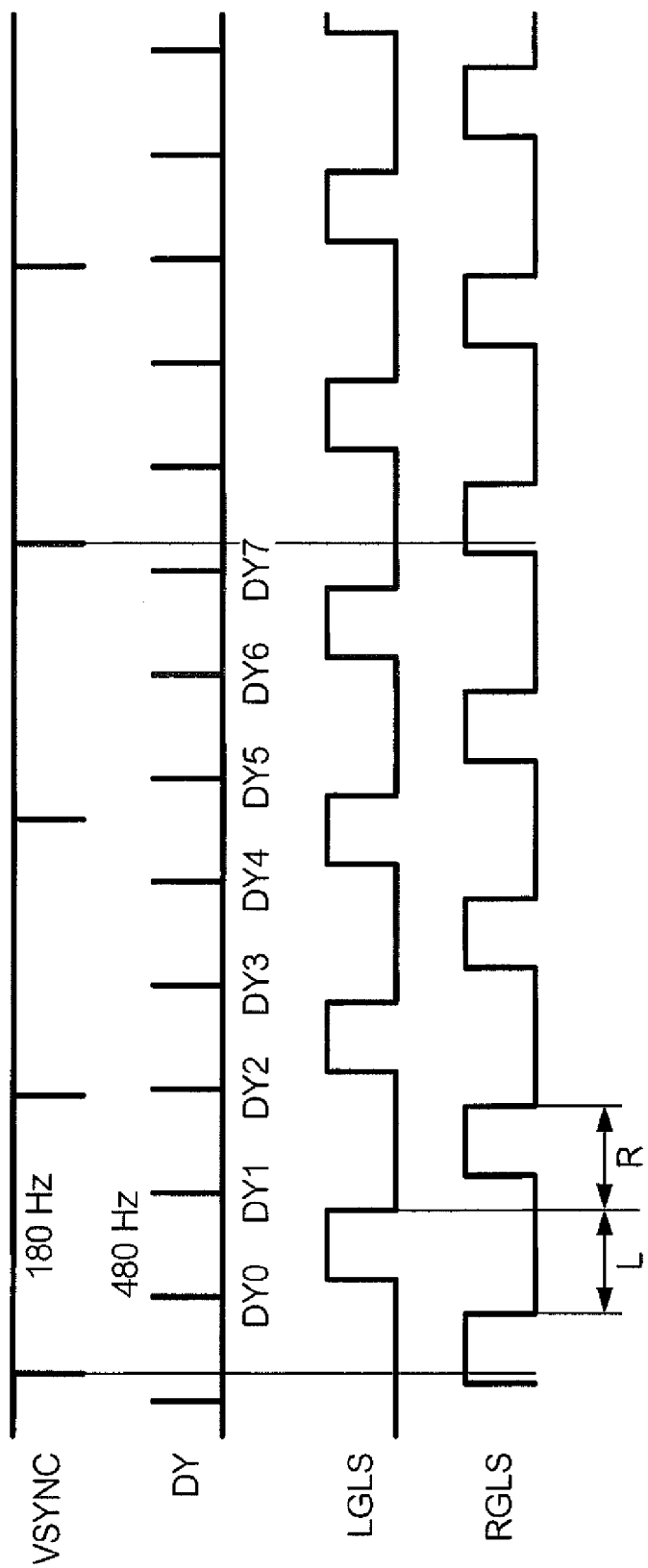
FIG. 12 shows an example where the multiplication number is a fraction.

FIG. 12 shows an example in which the multiplication number is a fraction. In this example, the frequency of the video signal Vin is 60 Hz (120 Hz each on the left and right) and the frequency of the external synchronization signal VSYNC is 180 Hz. The drive frequency of the display module 3 is 480 Hz. The left and right shutters opened and closed four times each while the external synchronization signal occurs three times (every three cycles). That is, in this example, a period equivalent to three cycles of the external synchronization signal is a reference cycle. The timing when the external synchronization signal VSYNC reaches high level every three times is reference timing (indicated by a broken line in FIG. 12). In this example, since the opening and closing of the shutters is carried out four times in the reference cycle, the frequency division number n of the frequency divider 1143 is 4. Also, in order to obtain the reference timing, the external synchronization signal VSYNC is divided by 3 by a frequency divider, not shown.

Although this example involves a special condition, this example is used hereinafter to explain the operation in order to facilitate understanding of the content.

Referring again to FIG. 9, in step S30, the spectacles control signal generation unit 114 starts outputting an internally synchronized spectacles control signal. Details are as follows.

Figure 13:
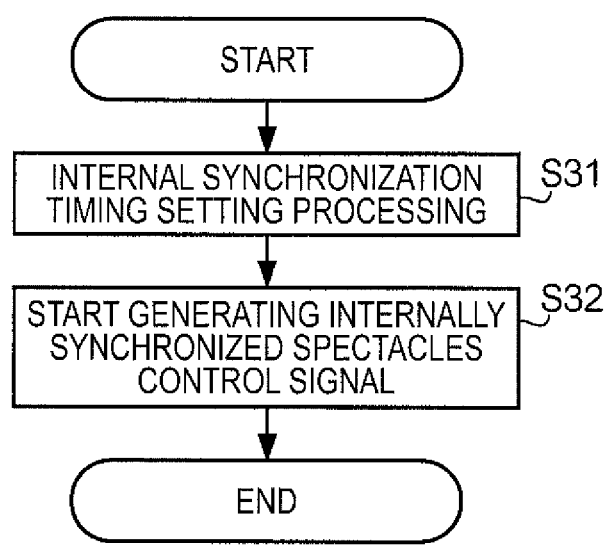
FIG. 13 is a flowchart showing details of processing in step S30.

FIG. 13 is a flowchart showing details of the processing in step S30. In step S31, the display drive signal generation circuit 113 carries out internal synchronization timing setting processing. The internal synchronization timing setting processing is processing to set which vertical synchronization timing is employed to open and close the shutters (which pulse of the vertical synchronization signal DY is used to open or close the shutters), based on the relation between the external synchronization signal VSYNC and the vertical synchronization signal. DY. In the example of FIG. 12, the vertical synchronization timing (pulse of the vertical synchronization signal DY) occurs eight times in the reference cycle (three cycles of the external synchronization signal VSYNC). Here, for convenience of explanation, these pulses are given numbers 0 to 7 and denoted as pulses DY0 to DY7. In this example, the display drive signal generation circuit 113 carries out setting to open the left-eye shutter at pulses DY0, DY2, DY4, and DY6 and to open the right-eye shutter at pulses DY1, DY3, DY5, and DY7. Moreover, the display drive signal generation circuit 113 sets which horizontal synchronization timing is employed to open and close the shutters, based on the relation between the vertical synchronization signal DY and the horizontal synchronization signal DX. For example, if there are 1100 scanning lines (that is, if there are 1100 pulses of the horizontal synchronization signal DX per cycle of the vertical synchronization signal DY), the display drive signal generation circuit 113 carries out setting to open the shutters on the 200-th scanning line (200-th pulse of the horizontal synchronization signal DX) and to close the shutters on the 1000-th scanning line (1000-th pulse of the horizontal synchronization signal DX). For example, with respect to the parameters described with reference to FIG. 7, the cycle Tp is set to a cycle equivalent to 480 Hz, the period To is set to a period when the 200-th to 1000-th scanning lines are selected, and the time period Ts is set to a time period when the difference between the timing of opening the left-eye shutter and the timing of opening the right-eye shutter is equivalent to 480 Hz.

In step S32, the DCO 1142 starts outputting a control signal LGLS and a control signal RGLS according to the parameters stored in the register 115. The waveforms of the control signal LGLS and the control signal RGLS are as shown in FIG. 12. Since the vertical synchronization signal DY has jitter, as described already, the control signal LGLS and the control signal RGLS similarly have jitter with respect to the external synchronization signal VSYNC.

Referring again to FIG. 9, in step S40, the CPU 141 measures the jitter. That is, the CPU 141 measures the cycle of the external synchronization signal VSYNC and the timing of opening/closing the shutters indicated by the control signal LGLS and the control signal RGLS, using the external synchronization signal VSYNC as a reference. Details are as follows.

Figure 14:
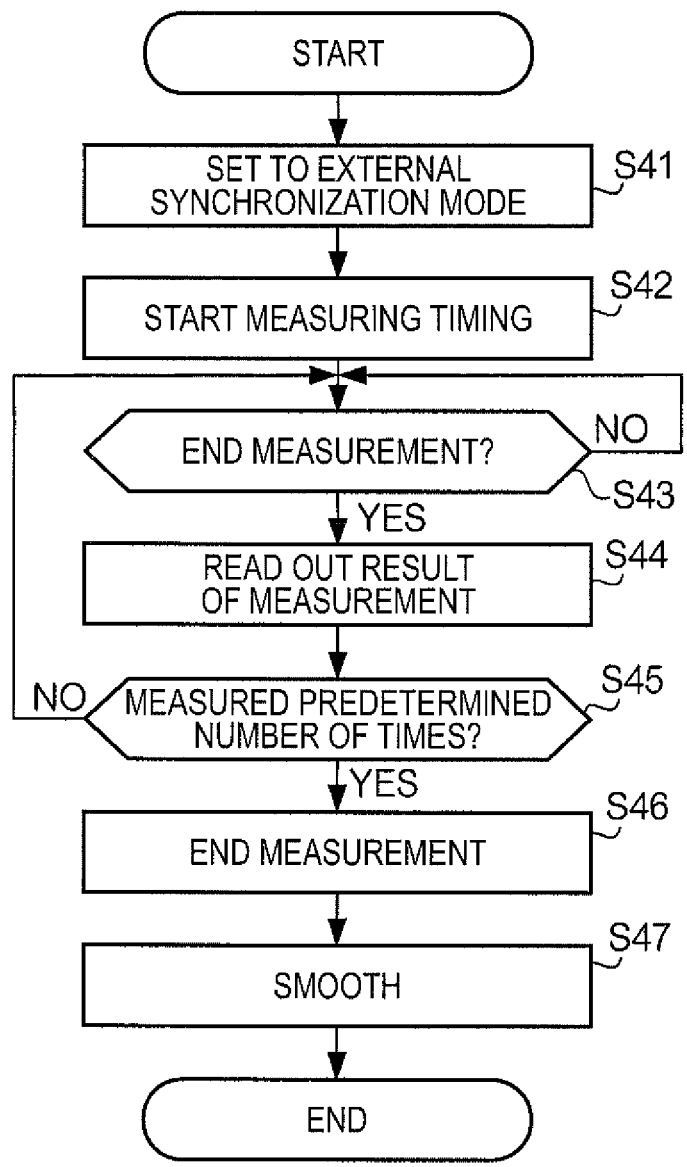
FIG. 14 is a flowchart showing details of processing in step S40.

FIG. 14 is a flowchart showing details of the processing in step S40. In step S41, the CPU 141 sets the operation of the spectacles control signal generation unit 114 to an external synchronization mode. The operation modes of the spectacles control signal generation unit 114 include an external synchronization mode and an internal synchronization mode. In the external synchronization mode, a spectacles control signal synchronized with the external synchronization signal VSYNC is generated. In the internal synchronization mode, a spectacles control signal is generated without using the external synchronization signal VSYNC (but using only an internally synchronized spectacles control signal). Specifically, in the internal synchronization mode, the interrupt control circuit 1141 does not generate an interrupt to the CPU 141. Meanwhile, in the external synchronization mode, the interrupt control circuit 1141 generates an interrupt to the CPU 141. Before step S40, the operation mode of the spectacles control signal generation unit 114 is set to the internal synchronization mode.

In step S42, the CPU 141 measures a time period τ equivalent to the reference cycle, that is, m cycles of the external synchronization signal VSYNC (where the frequency division number m is set, for example, in step S20). Moreover, the CPU 141 measures the time to the timing of opening/closing the shutters, using the external synchronization signal VSYNC as a reference. Specifically, the CPU 141 measures a time TLO until the left-eye shutter is opened, a time TLC until the left-eye shutter is closed, a time TRO until the right-eye shutter is opened, and a time TRC until the right-eye shutter is closed. These times are measured, using a clock signal. In the example of FIG. 12, the CPU 141 counts, for example, how many clocks the time τ is. The count value is stored in the register. The CPU 141 adds 1 to the count value of the register every clock.

In step S43, the CPU 141 determines whether to end the measurement or not. The determination of whether to end the measurement or not is carried out, for example, using the interrupt status register. Specifically, if the value of the interrupt status register is "1", the CPU 141 determines that the measurement should be ended. In this example, the interrupt control circuit 1141 monitors the external synchronization signal VSYNC that is frequency-divided by 3, and writes "1" into the interrupt status register if a pulse is generated. If the value of the interrupt status register is "1", that is, if it is determined that the measurement should be ended (step S43: YES), the CPU 141 rewrites the value of the interrupt status register with "0" and shifts the processing to step S44. If the value of the interrupt status register is "0", that is, if it is determined that the measurement should be continued (step S43: NO), the CPU 141 continues the measurement.

In step S44, the CPU 141 reads out the result of the measurement (count value) from the register. As the result of the measurement is read out, the CPU 141 initializes the count value stored in the register to zero. In step S45, the CPU 141 determines whether time is measured a predetermined number of times. If it is determined that time is measured a predetermined number of times (step S45: YES), the CPU 141 shifts the processing to step S46. Meanwhile, if it is determined that time is not measured a predetermined number of times (step S45: NO), the CPU 141 shifts the processing to step S42.

In step S46, the PCU 141 ends the measurement of time (clock counting). In step S47, the CPU 141 carries out smoothing of the result of the measurement that is read out. The smoothing is processing to calculate, for example, an average value of plural measurements (a predetermined number times). The parameters thus obtained, that is, the time t, the time TLO, the time TLC, the time TRO, and the time TRC, are used in the following processing according to need.

Referring again to FIG. 9, in step S50, the DCO 1142 starts outputting an externally synchronized spectacles control signal. Details of step S50 are as follows.

Figure 15:
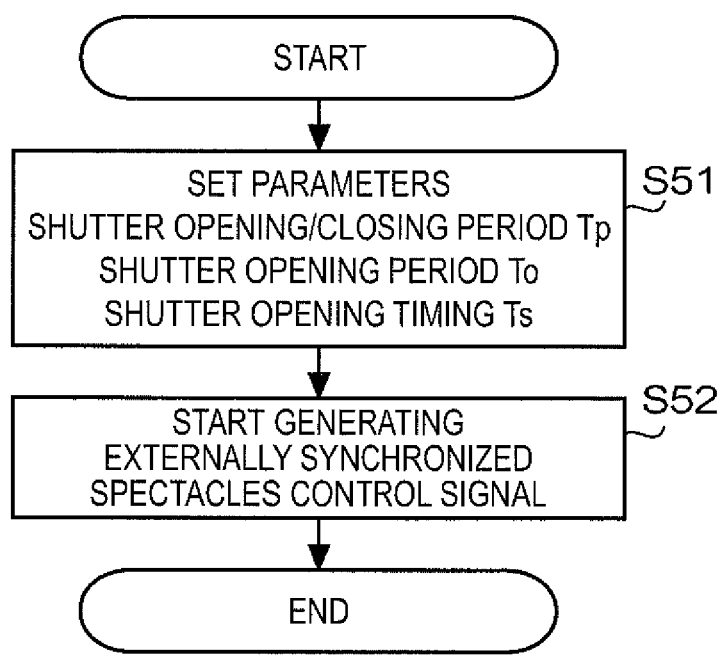
FIG. 15 is a flowchart showing details of processing in step S50.

FIG. 15 is a flowchart showing details of the processing in step S50. In step S51, the CPU 141 sets the timing of opening/closing the shutters. The first setting is the initial setting. The shutter opening/closing cycle Tp and the opening period To are decided by external synchronization conditions and the specifications of the stereoscopic spectacles 4 (for example, the balance between brightness and crosstalk). The shutter opening/closing timing Ts is decided by using the result of the measurement in step S40, in such a way that the timing Ts is close to the control signal LGLS and the control signal RGLS of internal synchronization and has no jitter.

In step S52, the DCO 1142 starts generating a control signal LGLS_S and a control signal RGLS_S that are externally synchronized, according to the parameters stored in the register 115. The DCO 1142 outputs the generated control signals. The DCO 1142 itself does not carry out different operations between the internal synchronization mode and the external synchronization mode, and simply oscillates according to the parameters stored in the register 115 in both operation modes.

Figure 16:
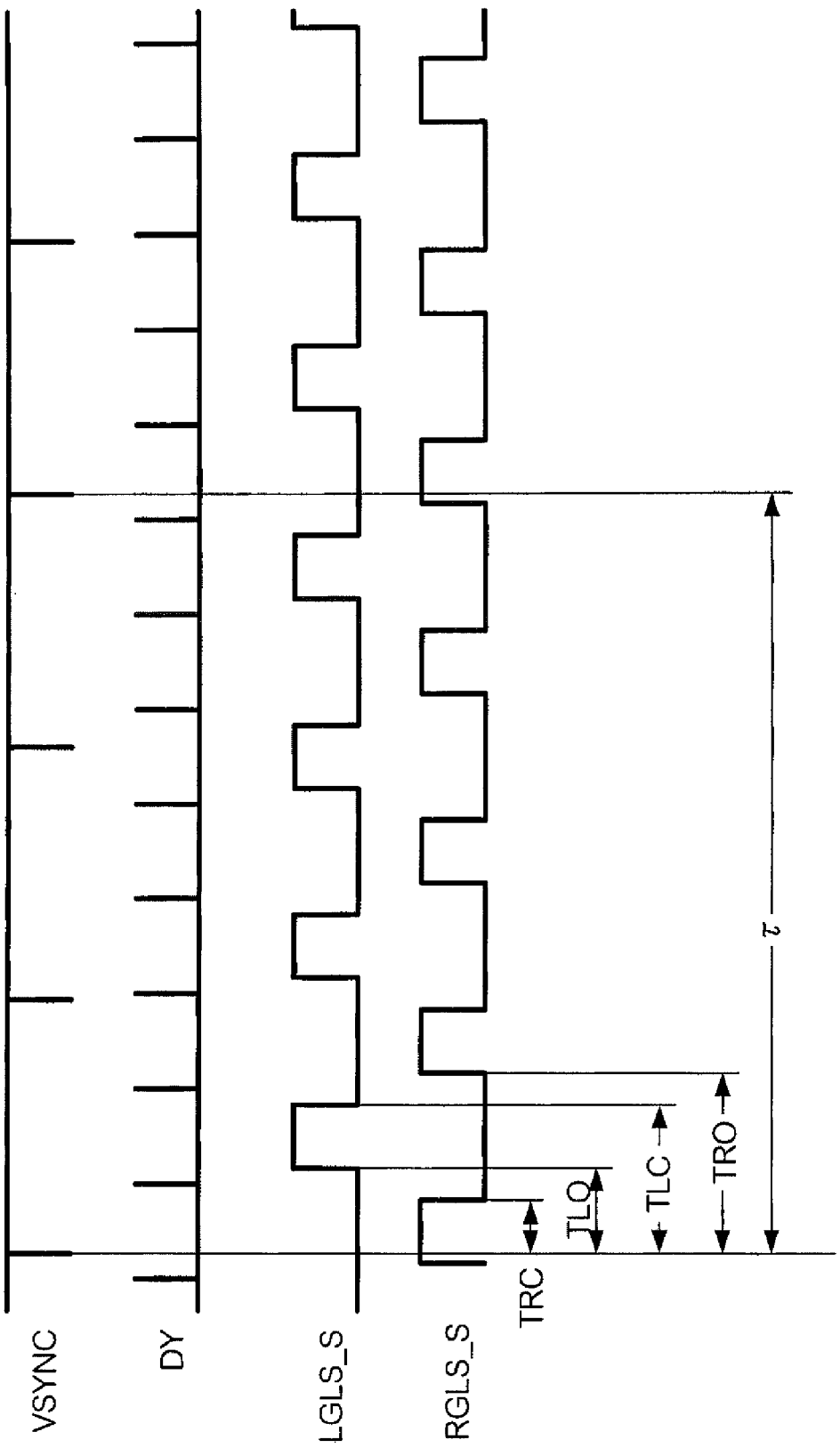
FIG. 16 illustrates a control signal LGLS_S and a control signal RGLS_S.

FIG. 16 illustrates the control signal LGLS_S and the control signal RGLS_S outputted from the DCO 1142. In this example, the DCO 1142 generates the control signal LGLS_S and the control signal RGLS_S according to one synchronization mode selected from plural synchronization mode. The plural synchronization modes include the following first synchronization mode and second synchronization mode. Which of the plural synchronization modes is to be used is set in step 910, for example, by the user's choice. FIG. 16 also shows the various times measured in step 940.

Figure 17:
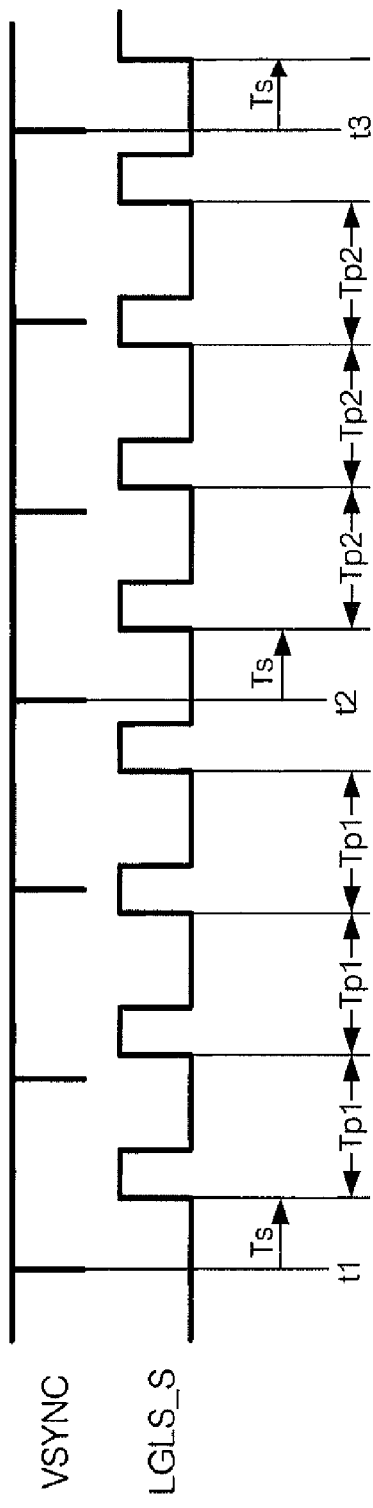
FIG. 17 illustrates a first synchronization mode.

FIG. 17 illustrates the first synchronization mode. In the first synchronization mode, the oscillation timing is reset every reference timing. That is, the time from each reference timing to the first oscillation is controlled each time to the time period Ts stored in the register 115. In this example, the register 115 has an area to store the cycle Tp of the current reference cycle and the next reference cycle. (the registered is double-buffered). In the following description, these registers are called first register and second register. At the first reference timing (time t1), the CPU 141 controls the DCO 1142 in such a way that the phase from the reference timing coincides with the time period Ts stored in the register 115. Here, the register used is switched from the second register to the first register. After the time t1, the DCO 1142 oscillates on the cycle Tp stored in the first register (in this example, Tp1). After the first oscillation and before oscillation in the next reference cycle, the CPU 141 carries out jitter correction. By the jitter correction, a parameter used in the next reference cycle is written to the register (second register) that is not used for oscillation. At the second reference timing (time t2), the DCO 1142 oscillates when the time period Ts stored in the register 115 has passed. Here, the register used is switched from the first register to the second register. After the time t2, the DCO 1142 oscillates on the cycle Tp stored in the second register (in this example, Tp2). After the first oscillation and before oscillation in the next reference cycle, the CPU 141 carries out jitter correction. By the jitter correction, a parameter used in the next reference cycle is written to the register (first register) that is not used for oscillation. Afterwards, this operation is repeated.

Figure 18:
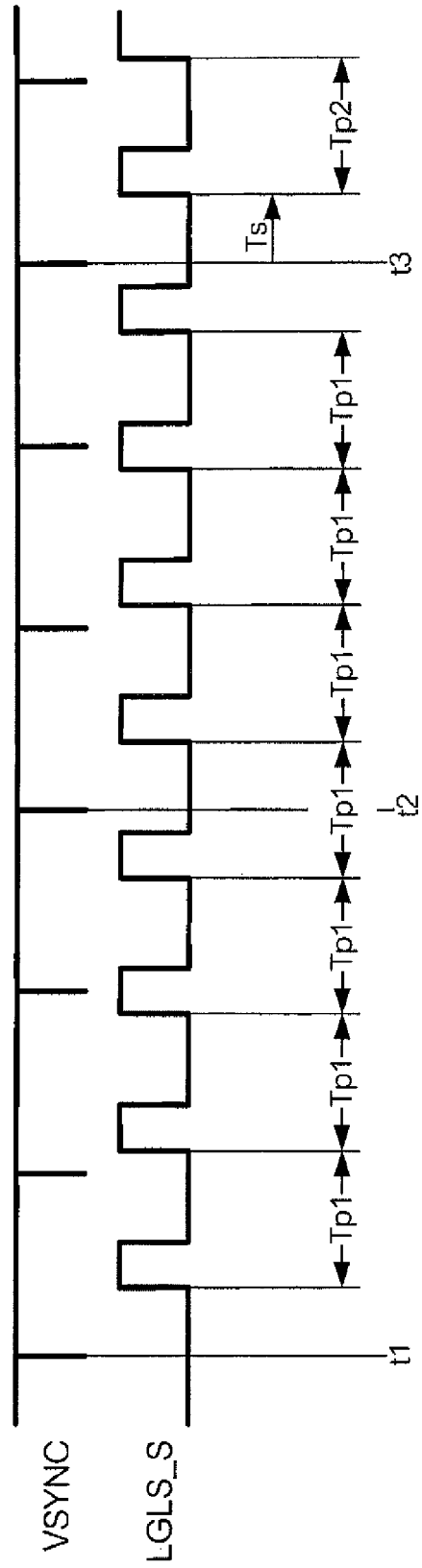
FIG. 18 illustrates a second synchronization mode.

FIG. 18 illustrates the second synchronization mode. In the second synchronization mode, the oscillation timing is not necessarily reset every reference timing. That is, unless the cycle is changed, the DCO 1142 continues oscillating on the same cycle even when crossing the reference cycle. For example, in the first oscillation after the reference timing t1, the CPU 141 measures jitter. The CPU 141 determines whether to change (update) the cycle Tp, based on the result of the measurement of jitter. If the cycle Tp is not to be changed, the register used (first register) is not switched at the next reference timing t2 and the DCO 1142 continues oscillating on the same cycle. In the first oscillation after the reference timing t2, the CPU 141 measures jitter. The CPU 141 determines whether to change the cycle Tp, based on the result of the measurement of jitter. If it is determined that the cycle Tp is to be changed, the CPU 141 writes a new cycle (Tp2) to the register that is not used (second register). If the cycle is updated, the DCO 1142 oscillates when the time period Ts stored in the register 115 has passed, at the next reference timing t3. At this point, the register used is switched from the first register to the second register. After the time t3, the DCO 1142 oscillates on the cycle Tp stored in the second register (in this example, Tp2).

Referring again to FIG. 9, in step S60, the CPU 141 determines whether to end the spectacles control. If transmission of a control signal to the stereoscopic spectacles 4 is to be stopped, for example, if the 3D display is to be ended in the video signal source 2, the CPU 141 determines that the spectacles control should be ended. If it is determined that the spectacles control should be ended (step S60: YES), the CPU 141 shifts the processing to step S110. If it is determined that the spectacles control should be continued (step S60: NO), the CPU 141 shifts the processing to step S70.

In step S70, the CPU 141 determines whether to change the synchronization condition. For example, if the video signal source 2 is switched to another device, the CPU 141 determines that the synchronization condition should be changed. If it is determined that the synchronization condition should be changed (step S70: YES), the CPU 141 shifts the processing to step S20. If it is determined that the synchronization condition should not be changed (step S70: NO), the CPU 141 shifts the processing to step S80.

In step S80, the CPU 141 monitors jitter. That is, the CPU 141 confirms whether jitter is successfully reduced as a result of external synchronization. Details are as follows.

Figure 19:
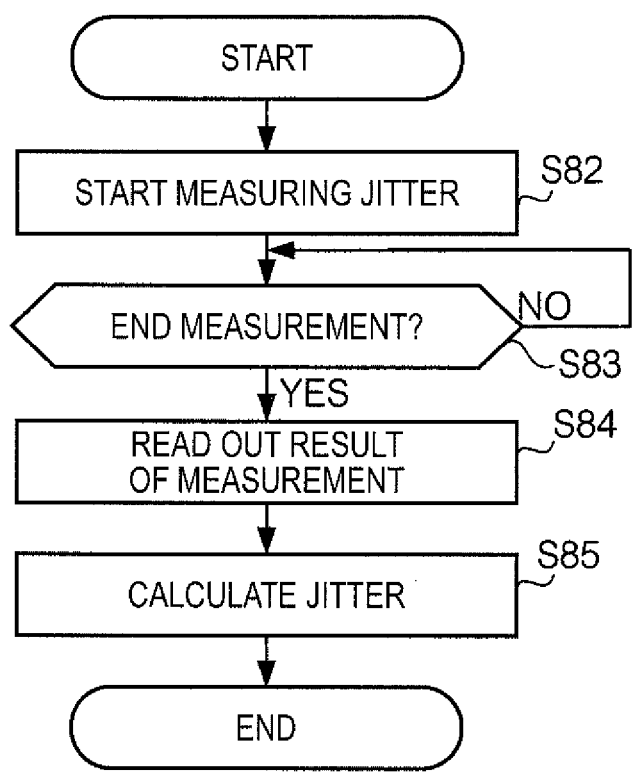
FIG. 19 is a flowchart showing details of step S80.

FIG. 19 is a flowchart showing details of the processing of step S80. In step S82, the CPU 141 measures the size of jitter. The definition of jitter varies depending on the synchronization mode used.

Figure 20A:
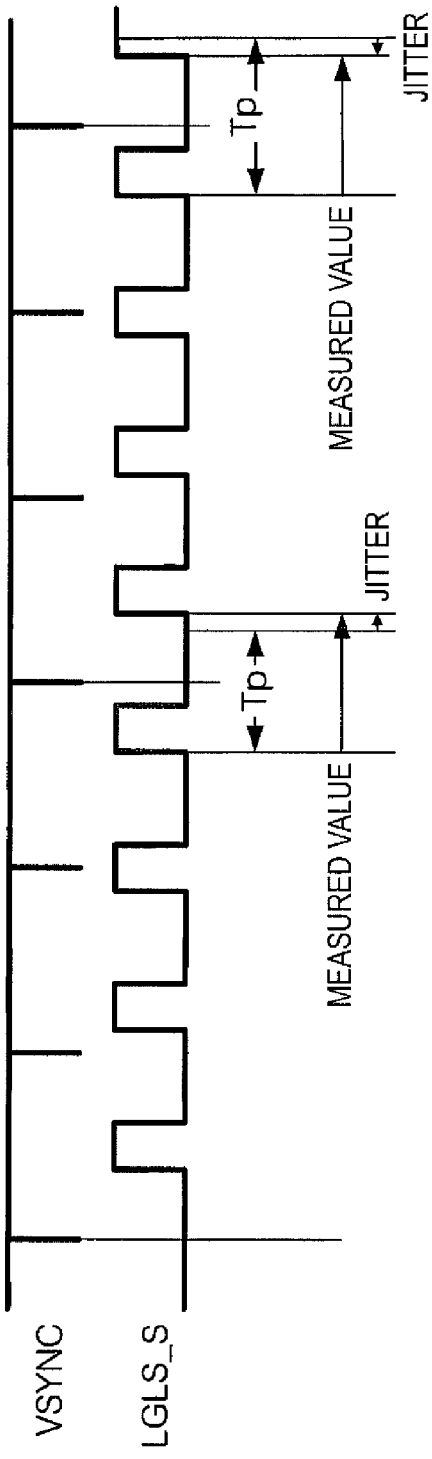
FIGS. 20A and 20B illustrate a definition of jitter.
Figure 20B:
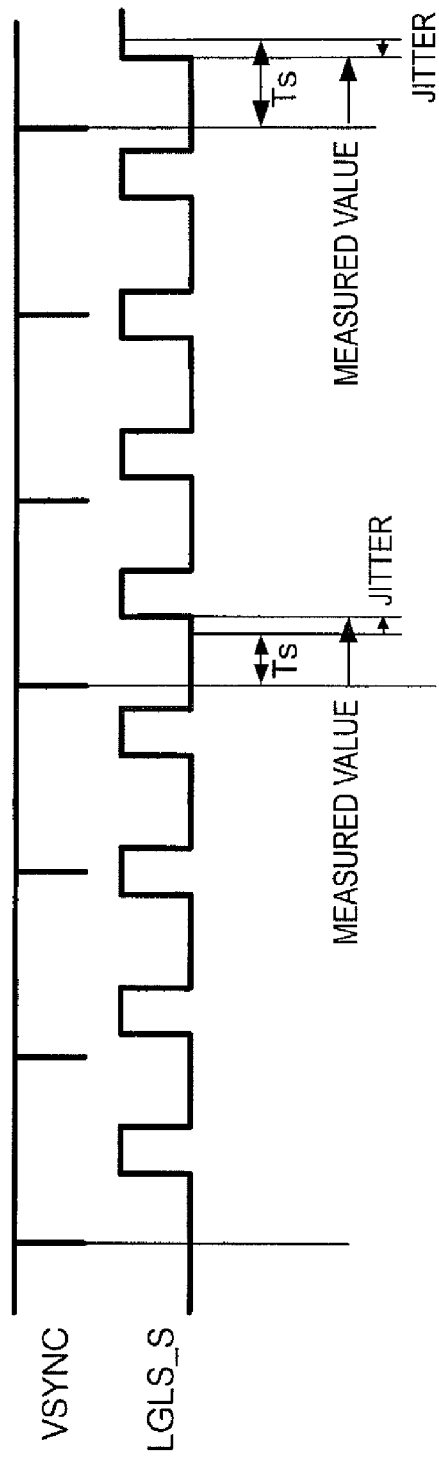

FIGS. 20A and 20B illustrate the definitions of jitter. FIG. 20A shows the definition of jitter in the first synchronization mode. FIG. 20B shows the definition of jitter in the second synchronization mode. In the first synchronization mode, the CPU 141 counts the cycle of the control signal LGLS_S (or the control signal RGLS_S). The difference between the count value of the cycle and the preset value Tp is jitter. In the second synchronization mode, the CPU 141 counts the phase of the control signal LGLS_S (or the control signal RGLS_S) from the pulse of the external synchronization signal of every n times. The difference between the count value of the phase and the preset value Ts is jitter.

Referring again to FIG. 19, in step S83, the CPU 141 determines whether to end the measurement of jitter. The determination of whether to end the measurement is carried out, for example, using the value of the interrupt status register. In this example, the interrupt control circuit 1141 monitors the frequency-divided control signal LGLS_S, and writes "1" to the status register when the signal turns from low level to high level. If the value of the status register is "0", the CPU 141 determines that the measurement of jitter should be continued. If the value of the status register is "1", the CPU 141 determines that the measurement of jitter should be ended. If it is determined that the measurement of jitter should be continued (step S83: NO), the CPU 141 continues measuring jitter. If it is determined that the measurement of jitter should be ended (step S83: YES), the CPU 141 shifts the processing to step S84.

In step S84, the CPU 141 reads out the result of the measurement (count value) from the register. In step S85, the CPU 141 calculates jitter from the count value. The definition of jitter, that is, the calculation formula varies depending on the synchronization mode used. In the first synchronization mode, left-eye jitter JL and right-eye jitter JR are calculated using the following equations (1) and (2).

$$JL = \text{(cycle count value of } LGLS\_S) - TpL \quad (1)$$

$$JR = \text{(cycle count value of } RGLS\_S) - TpR \quad (2)$$

In the second synchronization mode, jitter is calculated using the following equations (3) and (4).

$$JL = TsL - \text{(phase count value of } LGLS\_S) \quad (3)$$

$$JR = TsR - \text{(phase count value of } RGLS\_S) \quad (4)$$

Referring again to FIG. 9, in step S90, the CPU 141 determines whether the calculated jitter exceeds a predetermined threshold value. If it is determined that the jitter exceeds the threshold value (step S90: YES), the CPU 141 shifts the processing to step S40. If it is determined that the jitter does not exceed the threshold value (step S90: NO), the CPU 141 shifts the processing to step S100.

In step S100, the CPU 141 carries out jitter correction. Specifically, the CPU 141 updates the shutter opening/closing cycle Tp according to the result of filtering the jitter. Details are as follows.

Figure 21:
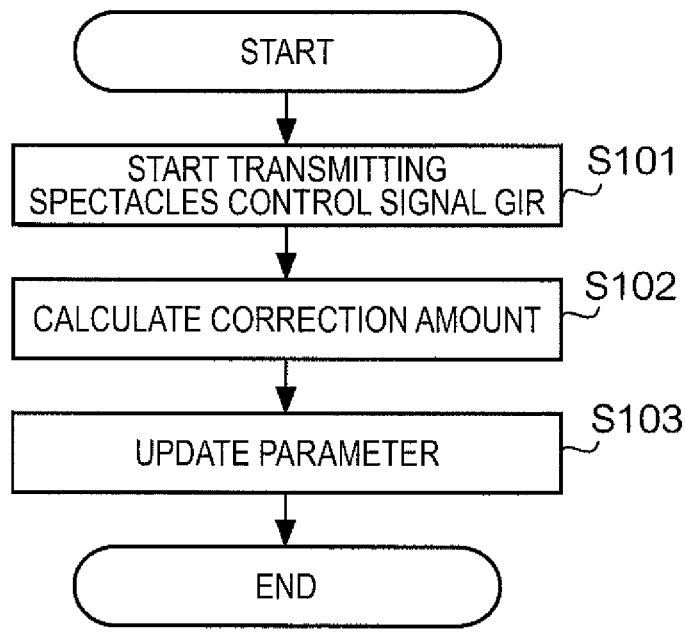
FIG. 21 is a flowchart showing details of step S100.

FIG. 21 is a flowchart showing details of step S100. In step S101, the CPU 141 controls the IR signal generation circuit 13 to start outputting a spectacles control signal GIR.

In step S102, the CPU 141 filters the calculated jitter and calculates a correction amount. Details are as follows.

Figure 22:
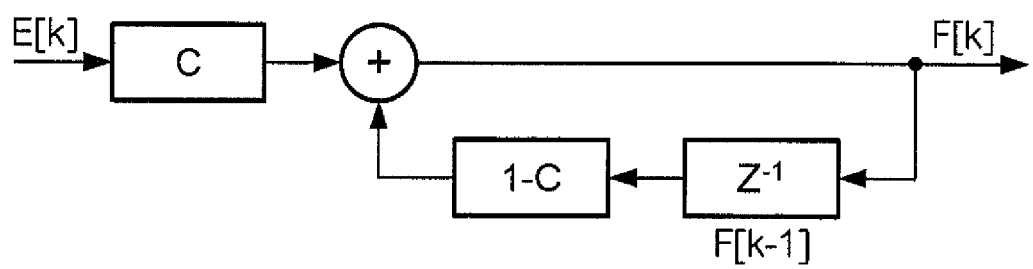
FIG. 22 illustrates filtering.

FIG. 22 illustrates filtering. Filtering F[k] is an arithmetic operation to switch the response characteristic according to error factors such as transition response at the time of follow-up, fluctuation of the external synchronization signal VSYNC in stationary state, and sudden changes. The response characteristic is decided by a filter coefficient C. A filer coefficient (1−C) is applied to the result of filtering F[k−1] in the immediately previous cycle. A filter coefficient C is applied to jitter (phase error) E[k] in the current cycle. The resulting values are added together. The result of the addition is the result of filtering F[k] in the current cycle.

The arithmetic operation of the filtering uses the following equations. Since this arithmetic operation is the same for both the left and right eyes, no particular distinction is made between the right eye and the left eye.

$$F[k] = C \times E[k] + (1-C) \times F[k-1] \quad (5)$$

$$U[k] = Kp \times F[k] + Ki \times \Sigma F[j] \quad (6)$$

$$Y[k] = Y[k-1] + U[k] \quad (7)$$

Figure 23:
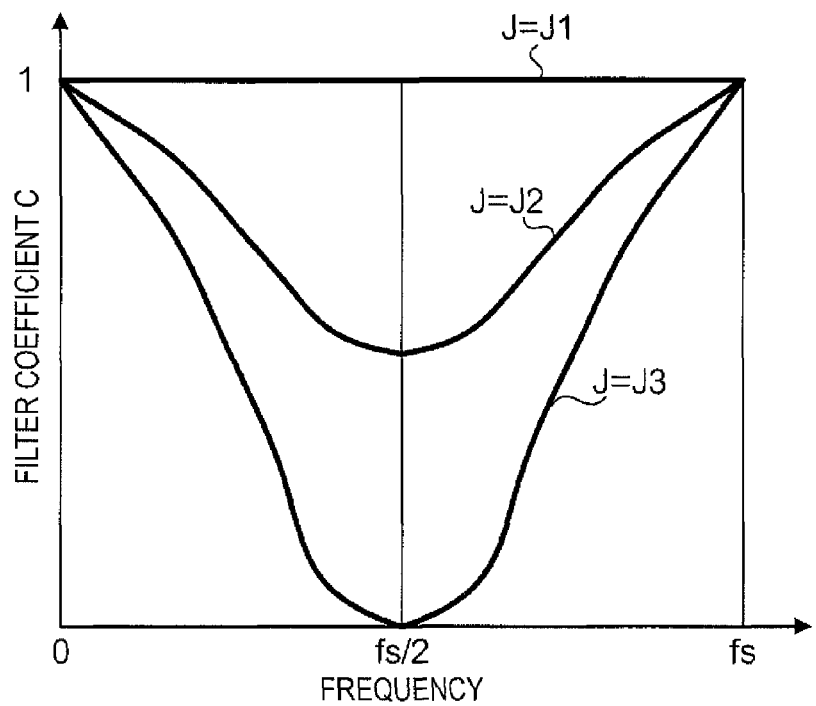
FIG. 23 illustrates frequency characteristics of a filter coefficient C.

In the equations, each variable has the following meaning.
E[k]: jitter in the k-th reference cycle
F[k]: result of IIR filtering in the k-th reference cycle
C: IIR filter coefficient
Ki: integral gain with respect to phase error after IIR filtering
Kp: proportional gain with respect to phase error after IIR filtering
U[k]: correction amount with respect to phase error in the k-th reference cycle
Tp[k]: shutter opening/closing cycle in the k-th reference cycle FIG. 23 illustrates frequency characteristics of the filter coefficient C. The vertical axis represents the gain of the filter. The horizontal axis represents the frequency of the signal. The maximum value of the frequency is a sampling frequency fs (a frequency equivalent to the reference cycle; in the example of FIG. 12, 60 Hz). FIG. 23 shows three characteristics with jitters J1, J2, and J3 (where J1>J2>J3). The filter coefficient C has the following characteristics. The size of the jitter J1 corresponds to the following case (1). The size of the jitter J3 corresponds to the following case (2).

(1) When the jitter is large (for example, equivalent to one horizontal scanning period or greater), the jitter is regarded as a frequency transition state, and the filter coefficient C is made closer to 1 in order to enhance responsiveness and lock up.

(2) When the jitter is at intermediate level (for example, approximately equivalent to one horizontal scanning period), the jitter is regarded as a fluctuation of the external synchronization signal VSYNC in stationary state, and the filter coefficient C is made closer to zero in order to enhance interrupting characteristics and restrain responsiveness.

(3) When the jitter is small (for example, equivalent to approximately several clocks), the jitter is regarded as a gradually accumulated error, and the filter coefficient C is made closer to 1 in order to enhance responsiveness and resolve the error.

That is, in a range from the state where the jitter is zero to a threshold value equivalent to the intermediate level of (2), the filter coefficient C approaches zero as the jitter increases. After this threshold value, the filter coefficient C approaches 1 as the jitter increases. The filter coefficient C has such frequency characteristics that C=1 holds when the frequency is zero, whereas C decreases with increase in the frequency until the frequency reaches ½ of the sampling frequency (Nyquist frequency).

Referring again to FIG. 21, in step S103, the CPU 141 updates the setting of the shutter opening/closing timing (the parameter that determines the shutter opening/closing timing). The correction of jitter is carried out by correcting the shutter opening/closing cycle Tp. In this example, the value of the shutter opening/closing cycle Tp[k] calculated in step S102 is written to the register 115. The corrected shutter opening/closing cycle Tp[k] is longer than Tp[k−1] if the shutter opening/closing timing is earlier than the reference timing, and shorter than Tp[k−1] if the shutter opening/closing timing is later than the reference timing. The DCO 1142 oscillates, using the corrected parameter. As the corrected parameter is used, a spectacles control signal that is more synchronized with the external synchronization signal VSYNC is outputted.

Referring again to FIG. 9, in step S110, the CPU 141 carries out end processing. Details are as follows.

Figure 24:
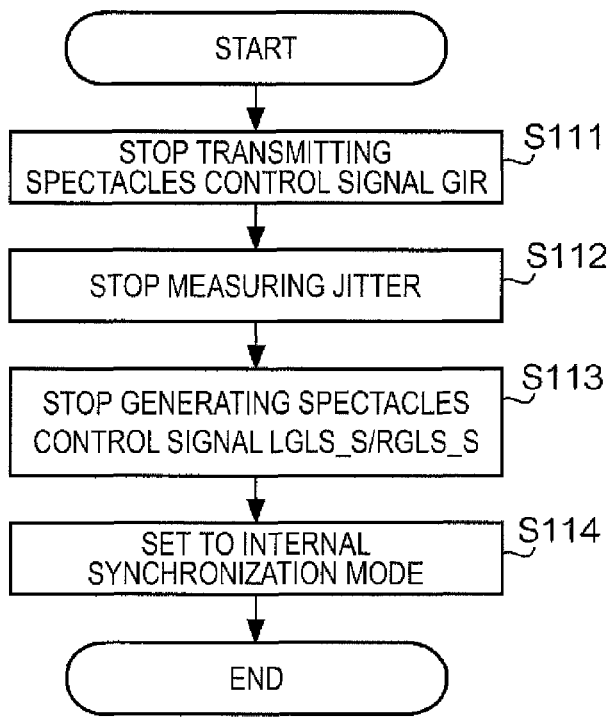
FIG. 24 is a flowchart showing details of step S110.

FIG. 24 is a flowchart showing details of step S110. In step S111, the CPU 141 controls the IR signal generation circuit 13 to stop outputting the spectacles control signal GIR. In step S112, the CPU 141 stops measuring jitter. In step S113, the CPU 141 stops generating the externally synchronized control signals LGLS_S and RGLS_S. In step S114, the CPU 141 changes the operation mode of the spectacles control signal generation unit 114 to the internal synchronization mode.

4. Modifications

The invention is not limited to the above embodiment and can be carried out with various modifications. Hereinafter, several modification examples will be described. Two or more of the following modifications may be combined.

The relation between the functional configuration and the hardware configuration of the stereoscopic system 1 is not limited to the relation described in the embodiment. For example, while an example of implementing the phase error detection unit 61 and the timing correction unit 62 as software is described in the embodiment, at least a part of the phase error detection unit 61 and the timing correction unit 62 may be implemented as hardware. That is, the display device 10 may have a circuit corresponding to at least a part of the phase error detection unit 61, the IIR filter 621, the proportional control unit 622, the integrating unit 623, the integral control unit 624, the adding unit 625, the adding unit 626, and the writing unit 627.

In the case where the phase error detection unit 61 is implemented by software, the method for the interrupt control circuit 1141 to apply an interrupt to the CPU 141 is not limited to rewriting the value of the interrupt status register. If the CPU 141 has a terminal that accepts a signal indicating the generation of an interrupt (interrupt signal), the interrupt control circuit 1141 may output an interrupt signal and thus apply an interrupt to the CPU 141.

The configuration of the timing correction unit 62 is not limited to the configuration described with reference to FIG. 8. For example, the connection relation between the IIR filter 621, the proportional control unit 622, and the integral control unit 623 may be different from the example of FIG. 8. Also, while a spectacles control signal is PID-controlled in the example of FIG. 8, at least one of proportional control (proportional control unit 622), integral control (integral control unit 624), and differential control (IIR filter 621) may be omitted.

In the embodiment, an example where the display device 10 as a single device has both the functions of the image processing unit 5 and the functions of the spectacles control unit 6 is described. However, the functions of the image processing unit 5 and the functions of the spectacles control unit 6 may be provided by separate devices.

The external synchronization signal used in the spectacles control signal generation unit 114 is not limited to the vertical synchronization signal VSYNC included in the input video signal. The stereoscopic system 1 may have a circuit which generates a synchronization signal using an input video signal. The spectacles control signal generation unit 114 may use the signal generated by this circuit, as an external synchronization signal.

In the embodiment, an example where the operation modes of the spectacles control signal generation unit 114 include the external synchronization mode and the internal synchronization mode is described. However, the spectacles control signal generation unit 114 may operate in a single operation mode (external synchronization mode), instead of discriminating between the external synchronization mode and the internal synchronization mode. Also, the synchronization modes of the DCO 1142 are not limited to the first synchronization mode and the second synchronization mode described in the embodiment. Accordingly, the method for the CPU 141 to calculate jitter is not limited to the method described in the embodiment. Other synchronization modes than the first synchronization mode and the second synchronization mode described in the embodiment may also be used. The DCO 1142 may operate in a single synchronization mode.

The calculation formulas, parameters, and coefficients used in the stereoscopic system 1 are not limited to those described in the embodiment. Other calculation formulas, parameters, and coefficients than those described in the embodiment may also be used. Moreover, the flowcharts described in the embodiment show an example of processing. A part of the processing included in the flowcharts may be omitted. The order of processing may be switched.

The spectacles control signal supplied from the spectacles control unit 6 to the stereoscopic spectacles 4 is not limited to an IR signal. The spectacles control signal may be other wireless signals than IR. Alternatively, the spectacles control signal may be supplied via wired communication.

The display device 10 is not limited to a projector. The display device 10 may also be a television, viewfinger-type or direct view monitor-type video tape recorder, car navigation device, pager, electronic notebook, electronic calculator, word processor, workstation, TV phone, POS terminal, digital still camera, mobile phone, tablet terminal, or personal computer.

What is claimed is:

1. A stereoscopic spectacles control device comprising:
   a processor configured to:
      generate a control signal indicating opening/closing timings of a shutter of stereoscopic spectacles based on an external synchronization signal;
      set detection periods having cycles based on the opening/closing timings of the generated control signal; and
      during the set detection periods: (i) detect a phase error between the external synchronization signal and the generated control signal; and (ii) if the detected phase error indicates that a first opening/closing timing of the shutter based on the generated control signal is earlier than a timing indicated by the external synchronization signal, correct the cycle of the detection period of the first opening/closing timing of the shutter to prolong the cycle.

2. The stereoscopic spectacles control device according to claim 1, wherein the processor is further configured to: if the detected phase error indicates that the first opening/closing timing of the shutter is later than the timing indicated by the external synchronization signal, correct the cycle of the detection period of the first opening/closing timing of the shutter to shorten the cycle.

3. The stereoscopic spectacles control device according to claim 1, wherein the processor is further configured to:
   determine, based on the detected phase error, a discrepancy of the first opening/closing timing of the shutter from the timing indicated by the external synchronization signal, and
   correct the cycle of the detection period of the lint opening/closing timing of the shutter in such a way that the discrepancy approaches a preset discrepancy parameter.

4. The stereoscopic spectacles control device according to claim 1, further comprising a memory configured to store the cycles of the detection periods, wherein the processor is further configured to
   calculate a first correction amount using a linear function of the detected phase error;
   calculate a second correction amount using an integral of the detected phase error; and
   add a sum of the first correction amount and the second correction amount to the cycle of the first opening/closing timing of these shutter stored in the memory.

5. The stereoscopic spectacles control device according to claim 4, wherein the processor is further configured to
  filter the detected phase error, using a filter coefficient that changes according to a size of the detected phase error,
  calculate the first correction amount, using the detected phase error that is filtered, and
  calculate the second correction amount, using the detected phase error that is filtered.

6. The stereoscopic spectacles control device according to claim 5, wherein the filter coefficient has such a characteristic that the filter coefficient approaches a minimum value as the detected phase error within a predetermined first range increases.

7. The stereoscopic spectacles control device according to claim 6, wherein the filter coefficient has such a characteristic that the filter coefficient approaches a maximum value as the detected phase error within a second range where the detected phase error is larger than in the first range increases.

8. The stereoscopic spectacles control device according to claim 1, wherein the external synchronization signal is a vertical synchronization signal included in a video signal.

9. A display device comprising:
  a processor configured to:
    generate a control signal indicating opening/closing timings of a shutter of stereoscopic based on an external synchronization signal;
    set detection periods having cycles based on the opening/closing timings of the generated control signal;
    during the et detection periods: (i) detect a phase error between the external synchronization signal and the generated control signal; and (ii) if the detected phase error indicates that a first opening/closing timing of the shutter based on the generated control signal is earlier than a timing indicated by the external synchronization signal, correct the cycle of the detection period of the first opening/closing timing of the shutter to prolong the cycle; and
    output to a display a stereoscopic video based on a video signal synchronized with the external synchronization signal.

10. A stereoscopic spectacles control method comprising:
  generating a control signal indicating opening/closing timings of a shutter of stereoscopic spectacles based on an external synchronization signal;
  setting detection periods having cycles bawd on the opening/closing timings of the generated control signal;
  during the set detection periods: (i) detecting a phase error between the external synchronization signal and the generated control signal; and (ii) if the detected phase error indicates that a first opening/closing timing of the shutter based on the generated control signal is earlier than a timing indicated by the external synchronization signal, correct the cycle of the detection period of the first opening/closing timing of the shutter to prolong the cycle.

11. The stereoscopic spectacles control device according to claim 1, wherein the processor is further configured to: control the stereoscopic spectacles to supply power to a circuit which receives the generated control signal only during the set detection periods, and to not supply power during other periods.

* * * * *